(12) United States Patent
Wang et al.

(10) Patent No.: US 10,979,903 B2
(45) Date of Patent: Apr. 13, 2021

(54) KEY GENERATION AND DISTRIBUTION METHOD BASED ON IDENTITY-BASED CRYPTOGRAPHY

(71) Applicant: HUAWEI INTERNATIONAL PTE. LTD., Singapore (SG)

(72) Inventors: Haiguang Wang, Singapore (SG); Jie Shi, Singapore (SG); Xin Kang, Singapore (SG)

(73) Assignee: Huawei International Pte. Ltd., Singapore (SG)

(*) Notice: Subject to any disclaimer, the term of this patent is extended or adjusted under 35 U.S.C. 154(b) by 138 days.

(21) Appl. No.: 16/258,180

(22) Filed: Jan. 25, 2019

(65) Prior Publication Data
US 2019/0159023 A1    May 23, 2019

Related U.S. Application Data

(63) Continuation of application No. PCT/SG2017/050164, filed on Mar. 28, 2017.

(30) Foreign Application Priority Data

Jul. 26, 2016 (SG) ............................. 10201606165S

(51) Int. Cl.
*H04W 12/04* (2021.01)
*H04L 9/14* (2006.01)
(Continued)

(52) U.S. Cl.
CPC ....... *H04W 12/0401* (2019.01); *H04L 9/0866* (2013.01); *H04L 9/14* (2013.01);
(Continued)

(58) Field of Classification Search
CPC ......... H04W 12/0401; H04W 12/0609; H04W 12/04031; H04W 12/009; H04W 12/004;
(Continued)

(56) References Cited

U.S. PATENT DOCUMENTS

2004/0179684 A1    9/2004    Appenzeller et al.
2006/0023887 A1    2/2006    Agrawal et al.
(Continued)

FOREIGN PATENT DOCUMENTS

CN    1216352 C    8/2005
CN    102036238 A    4/2011
(Continued)

OTHER PUBLICATIONS

Cakulev et al.,"IBAKE: Identity-Based Authenticated Key Exchange," RFC6539, Independent Submission, pp. 1-13 (Mar. 2012).
(Continued)

*Primary Examiner* — Dant B Shaifer Harriman
(74) *Attorney, Agent, or Firm* — Leydig, Voit & Mayer, Ltd.

(57) ABSTRACT

A key generation and distribution method is disclosed. The method includes receiving a first request from a first requestor, the first requestor comprising an identity of the first requestor; generating a new identity (ID) based on the identity of the first requestor; generating a secret key for the new ID with a predetermined pair of global keys, namely a Global Secret Key (GSK) and a Global Public Key (GPK); transmitting the new ID, secret key and the GPK to the first requestor; receiving a request from a second requestor, the request comprising a plurality of identities; generating an new ID for each of the plurality of identities; generating a secret key based on the IBC key generation algorithm for each of the plurality of new IDs; and transmitting the plurality of new IDs, secret keys corresponding to each of the plurality of IDs and the GPK to the second requestor.

19 Claims, 18 Drawing Sheets

(51) Int. Cl.
*H04L 9/30* (2006.01)
*H04L 9/32* (2006.01)
*H04W 12/06* (2021.01)
*H04W 12/00* (2021.01)
*H04L 9/08* (2006.01)
*H04L 29/06* (2006.01)

(52) U.S. Cl.
CPC .......... *H04L 9/3073* (2013.01); *H04L 9/3247* (2013.01); *H04L 63/062* (2013.01); *H04W 12/004* (2019.01); *H04W 12/009* (2019.01); *H04W 12/00512* (2019.01); *H04W 12/00514* (2019.01); *H04W 12/04031* (2019.01); *H04W 12/06* (2013.01); *H04W 12/0609* (2019.01); *H04W 12/0023* (2019.01)

(58) Field of Classification Search
CPC ..... H04W 12/00512; H04W 12/00514; H04W 12/06; H04W 12/0023; H04L 9/0866; H04L 9/14; H04L 9/3073; H04L 9/3247; H04L 63/052
USPC .......................................................... 380/278
See application file for complete search history.

(56) References Cited

U.S. PATENT DOCUMENTS

| | | |
|---|---|---|
| 2010/0031042 A1 | 2/2010 | Di Crescenzo et al. |
| 2012/0308012 A1 | 12/2012 | Yoon |
| 2013/0110920 A1 | 5/2013 | Broustis et al. |
| 2014/0281493 A1* | 9/2014 | Nakhjiri .................. H04L 9/006 713/155 |
| 2015/0039883 A1 | 2/2015 | Yoon et al. |
| 2019/0297083 A1* | 9/2019 | Li .......................... H04W 76/11 |

FOREIGN PATENT DOCUMENTS

| | | |
|---|---|---|
| CN | 103947176 A | 7/2014 |
| CN | 105763558 A | 7/2016 |

OTHER PUBLICATIONS

V. Cakulev et al., "IBAKE: Identity-Based Authenticated Key Exchange; draft-cakulev-ibake-04.txt," Network Working Group, total 16 pages (Apr. 20, 2011).

CN/201780028201.4, Office Action/Search Report dated Jan. 4, 2021.

* cited by examiner

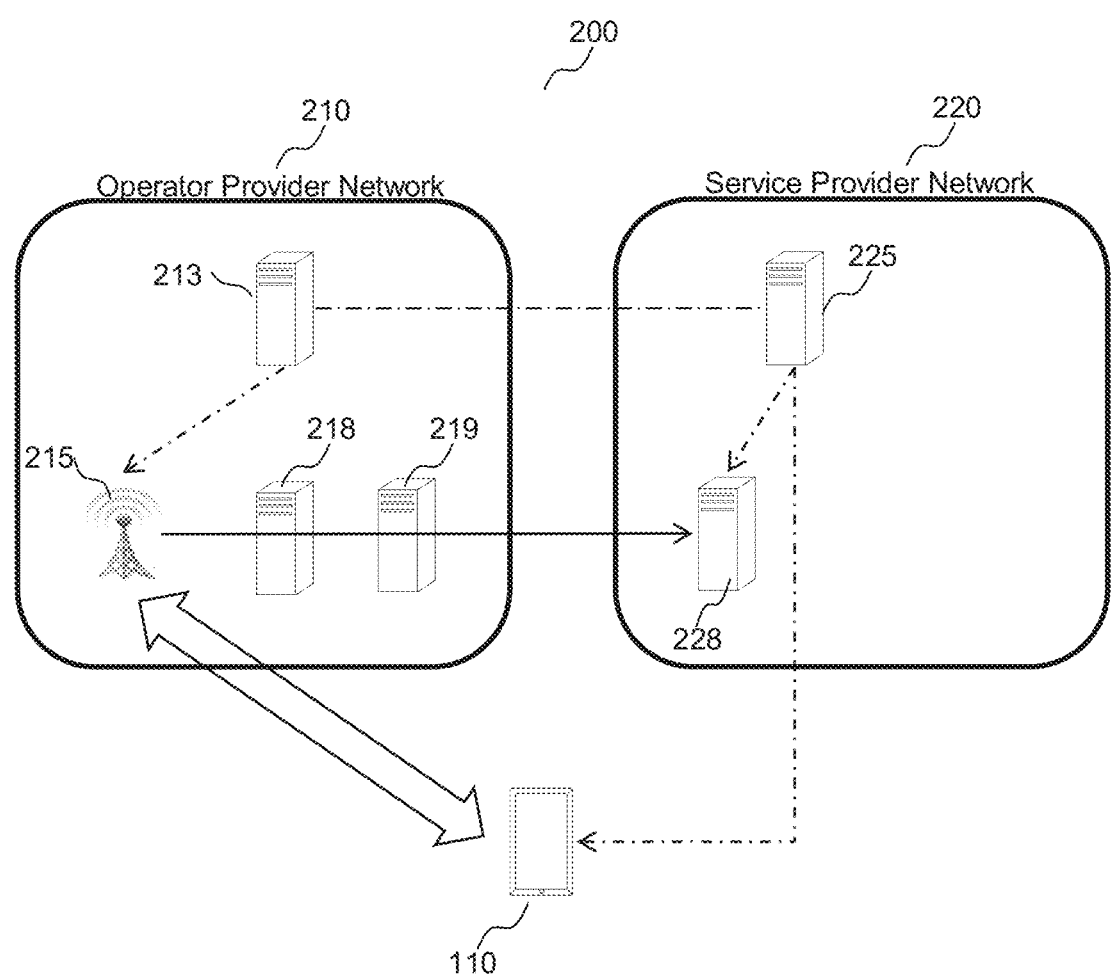
Figure 2.1

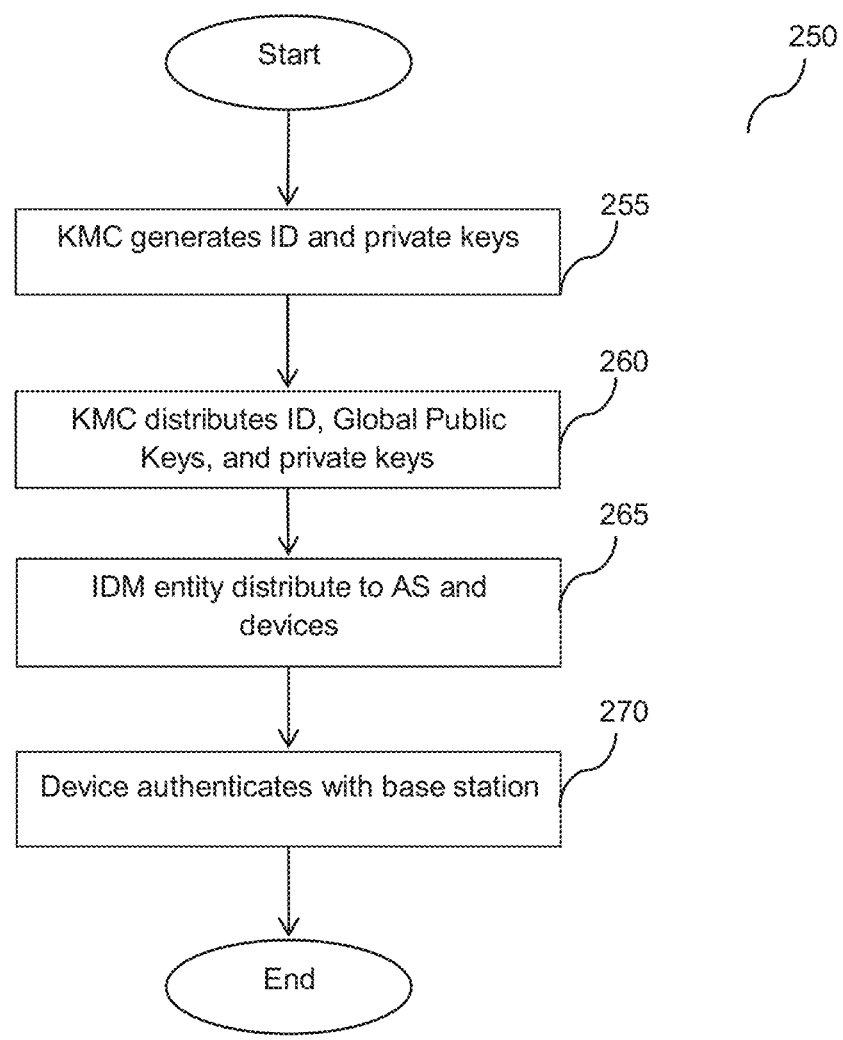
Figure 2.2

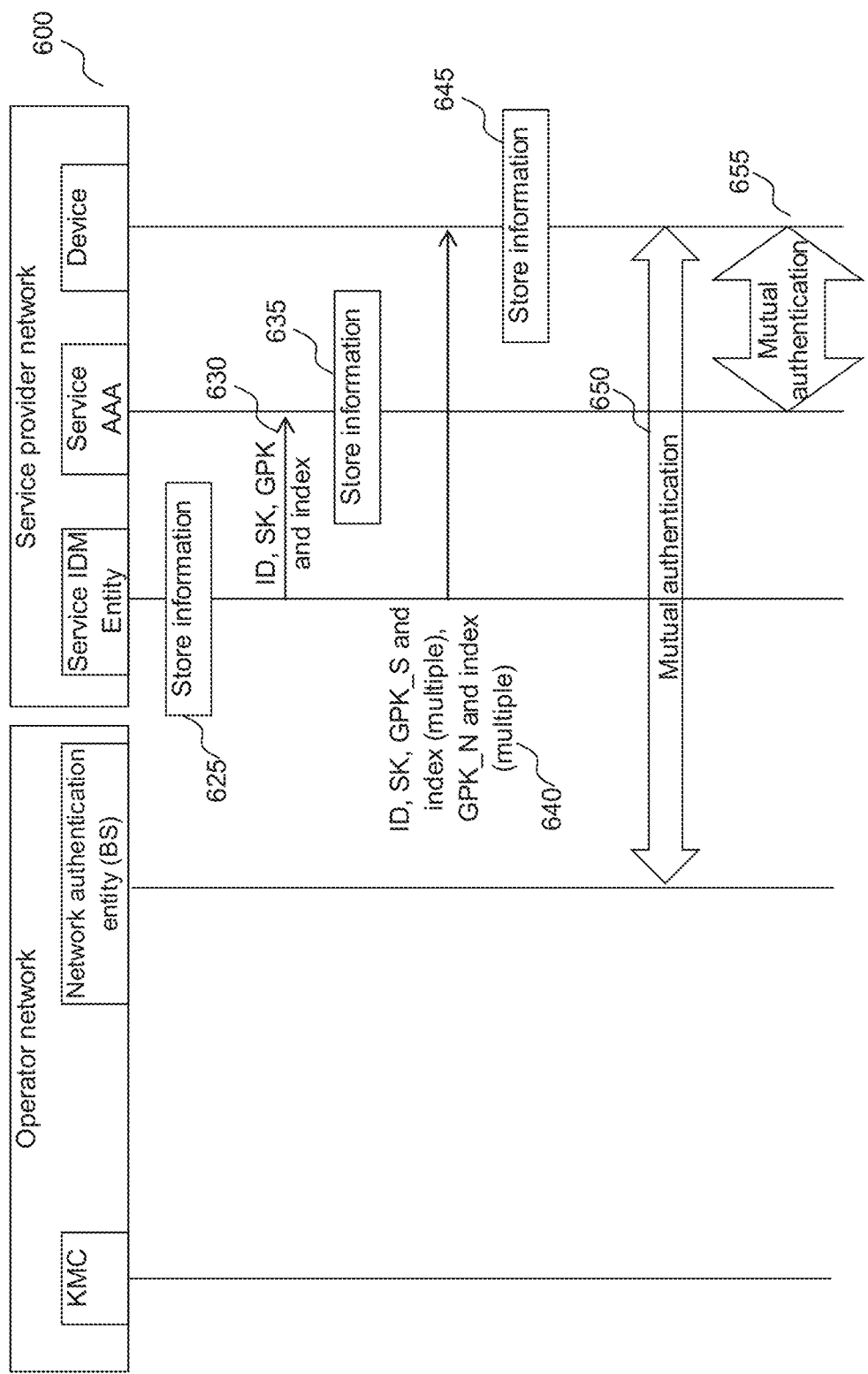
Figure 6 (Continue)

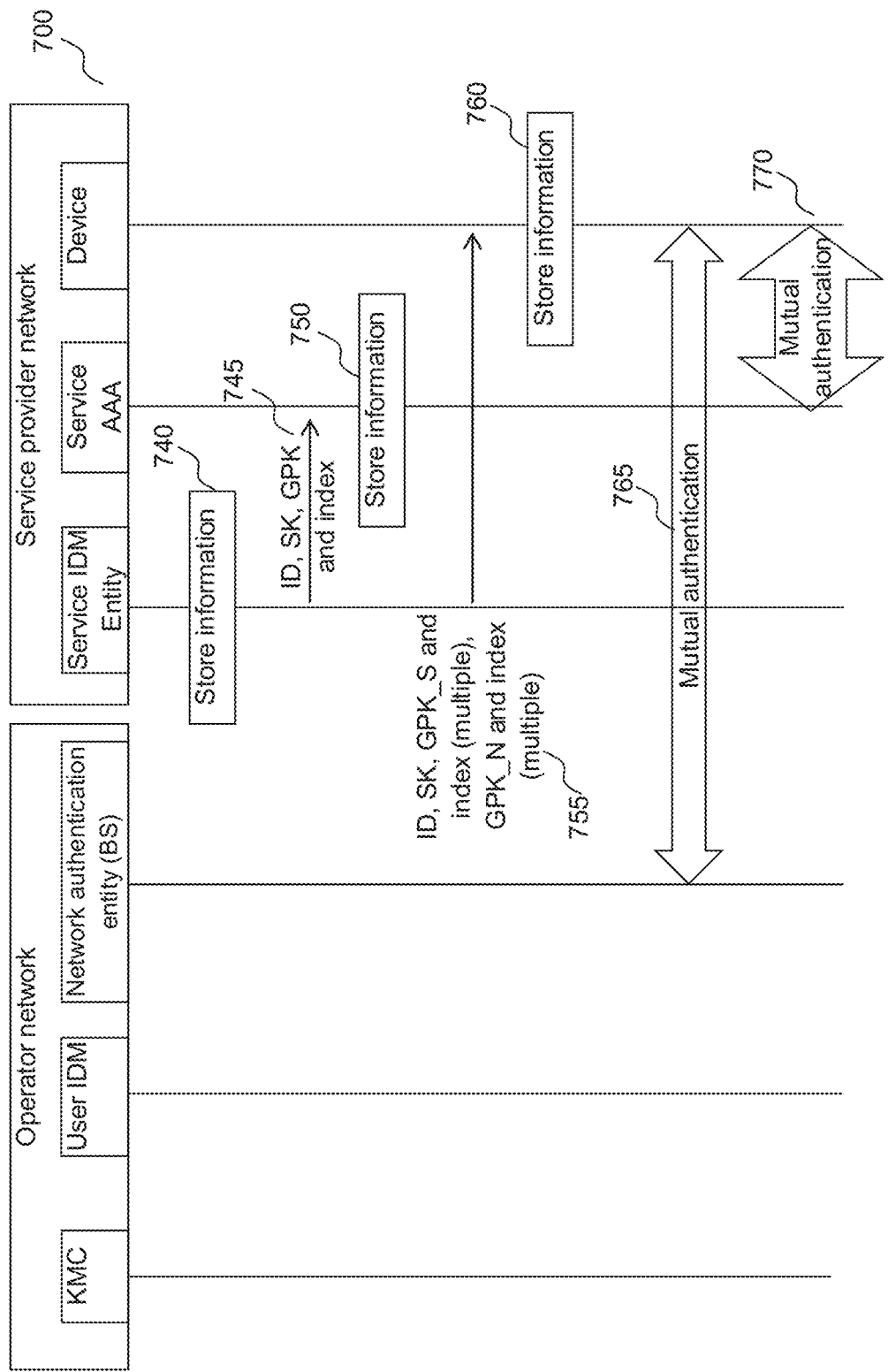
Figure 7 (continue)

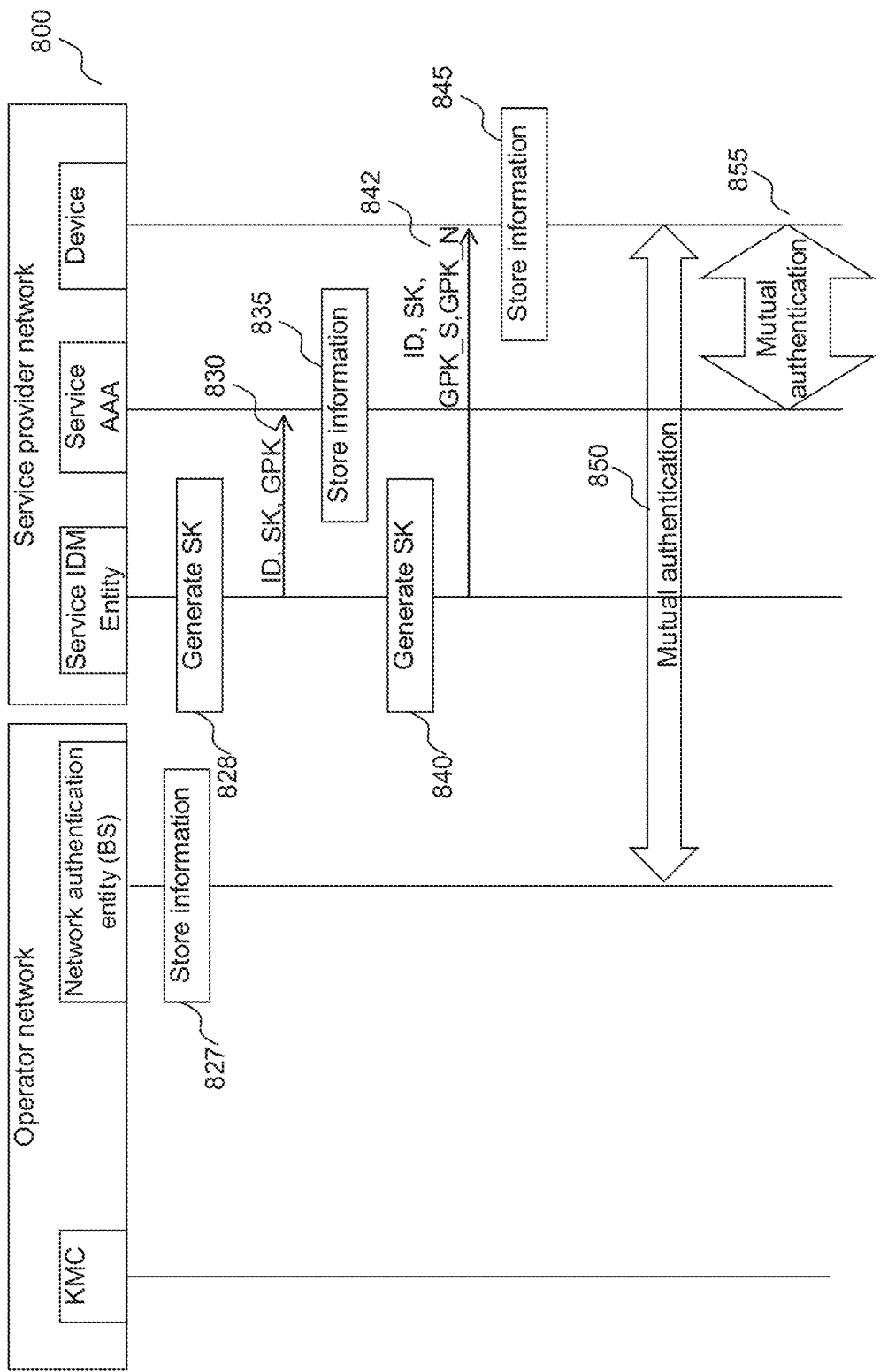
Figure 8 (continue)

KEY GENERATION AND DISTRIBUTION METHOD BASED ON IDENTITY-BASED CRYPTOGRAPHY

CROSS-REFERENCE TO RELATED APPLICATIONS

This application is a continuation of International Application No. PCT/SG2017/050164, filed on Mar. 28, 2017, which claims priority to Singapore Patent Application No. 10201606165S, filed on Jul. 26, 2016. The disclosures of the aforementioned applications are hereby incorporated by reference in their entireties.

FIELD OF THE INVENTION

Embodiments of the invention relate to a distributed authentication framework based on identity-based cryptography. Particularly, this invention relates to a method and system for generating and distributing keys based on identity-based cryptography.

SUMMARY OF THE PRIOR ART

In the past few years, the number of smart phone users has grown exponentially and many mobile users access the internet via mobile cellular network. As we are approaching the introduction of the 5th generation mobile networks, it is expected that more devices and services will be put on the mobile Internet. It is expected that it could be at least 10-20 times of the mobile devices today, in the number of 50-100 billion. In order to manage such a large number of devices, the current network architecture requires some changes. One reason is that the current network is designed for voice and mobile data services, which implements a centralized user management and authentication method. This is not scalable and the cost for user authentication and management is high.

FIG. 1 shows the existing user authentication and management framework 100. User devices 110 and network use asymmetric key-based authentication technology. At the network side, a centralized server, known as Home Subscriber System (HSS) 130, is used to store the user identity and credentials for authentication. At user side, an embedded device, named as Universal Integrated Circuit Card (UICC), is used to store the user credential. When a user device 110 wants to access the network, the user device 110 performs a mutual authentication 150 with the Mobility Management Entity (MME) 120 in the core network through the EPS-AKA protocol. In a mutual authentication, after receiving the authentication request from user device 110 via the base station 140, the MME 120 further gets authentication vector from HSS 130 and authenticate with user device 110 via the base station 140.

As mentioned above, with the centralized authentication and user management framework, the management cost for large number of devices is very high. Hence, those skilled in the art are striving to improve the current authentication framework.

SUMMARY OF THE INVENTION

The above and other problems are solved and an advance in the art is made by systems and methods provided by embodiments in accordance with the invention. A first advantage of embodiments of systems and methods in accordance with the invention is that the authentication is decentralized. This reduces the stress that is affected in a centralized system. This would also help to lower operating cost of an operator provider. A second advantage of embodiments of systems and methods in accordance with the invention is that a distributed authentication framework allows the network to be scalable. Flexibility is achieved since key generation is assisted by another entity.

The above advantages are provided by embodiments of a system and a method of generating and distributing IDs and keys between an operator provider network and a service provider network.

In accordance with an aspect of the disclosure, a key generation and distribution method for an authentication framework for an operator provider network and a service provider network is provided in the following manner. The method comprises:

receiving a first request from a first requestor, the first request comprising an identity of the first requestor; generating a new identity (ID) based on the identity of the first requestor; generating a secret key based on an Identity Based Cryptography (IBC) key generation algorithm for the new ID with a predetermined pair of global keys, namely Global Secret Key (GSK), Global Public Key (GPK); transmitting the new ID, secret key and the GPK to the first requestor;

receiving a request from a second requestor, the request comprising a plurality of identities; generating an new ID for each of the plurality of identities; generating a secret key based on the IBC key generation algorithm for each of the plurality of new IDs; and transmitting the plurality of new IDs, secret keys corresponding to each of the plurality of IDs and the GPK to the second requestor.

In accordance with an aspect of the disclosure, a key generation and distribution method for an authentication framework for an operator provider network and a service provider network is provided in the following manner. The method comprises:

receiving a first request from a first requestor;
generating a first identity (ID) for the first requestor;
generating a secret key based on an Identity Based Cryptography (IBC) key generation algorithm for the new ID with a pair of global keys, namely Global Secret Key (GSK), Global Public Key (GPK);
transmitting the new ID, secret key and the GPK to the first requestor;
receiving a request from a second requestor, the request comprising a plurality of identities;
generating a new ID for each of the plurality of identities;
generating a secret key based on the IBC key generation algorithm for each of the plurality of new IDs; and
transmitting the plurality of new IDs, secret keys corresponding to each of the plurality of IDs and the GPK to the second requestor; and
transmitting new IDs and secret keys to devices; and
performing mutual authentication between devices and one of the first and second requestors.

Further, wherein the first requestor comprising an identity of the first requestor;
Wherein the step of generating a first identity (ID) for the first requestor comprising:
generating a first identity (ID) based on the identity for the first requestor.

In accordance with an embodiment of the disclosure, the step of generating the secret key based on the IBC key generation algorithm for the new ID with the pair of global keys, namely GSK, and GPK comprises: determining the pair of global keys from a plurality of pairs of global keys, and generating the secret key for the new ID with the determined pair of global keys. In yet another embodiment, the method repeats the steps of determining the pair of global keys from the plurality of pairs of global keys to determine a next pair of global keys from the plurality of pairs of global keys, and generating another secret key for the new ID to obtain a plurality of secret keys for the new ID. The method then transmit the plurality of indexes associated to the pairs of global keys used for generating the secret keys.

In accordance with an embodiment of the disclosure, the step of generating the secret key based on the IBC key generation algorithm for each of the plurality of new IDs comprises: determining the pair of global keys from a plurality of pairs of global keys, and generating the secret key for the new ID with the determined pair of global keys. In yet another embodiment, the method repeats the steps of determining the pair of global keys from the plurality of pairs of global keys to determine a next pair of global keys from the plurality of pairs of global keys, and generating another secret key for each of the plurality of new IDs to obtain a plurality of secret keys for each of the plurality of new IDs. The method then transmit the plurality of indexed associated to the pairs of global keys used for generating the secret keys.

In accordance with an embodiment of the disclosure, the first requestor is a network authentication entity residing at the operator provider network and the second requestor is a Service Identity Management (IDM) entity residing at the service provider network.

In accordance with an embodiment of the disclosure, the new identity is generated by combining the identity of the first requestor and an expiry date and/or time of the identity of the first requestor.

In accordance with an embodiment of the disclosure, the secret key is generated by using the new identity, the predetermined pair of global keys (GSK, GPK), together with the IBC key generation algorithm.

In accordance with another aspect of the disclosure, a key generation and distribution system for an authentication framework for an operating provider network comprising an authentication entity and a service provider network comprising an authentication server is provided in the following manner. The key generation and distribution system comprises: a Network Identity Management (IDM), a User IDM and a Key Management Center (KMC) residing at the operating provider network; and a Service IDM entity residing at the service provider network, wherein the Network IDM comprises a processor, a memory, and instructions stored on the memory and executable by the processor to: receive a request for credential from the authentication entity, the request comprising an identity of the authentication entity; generate a new identity (ID) based on the identity of the authentication entity; transmit the new ID to the KMC; receive a secret key from the KMC; transmit the new ID and secret key to the authentication entity;

the User IDM comprises a processor, a memory, and instructions stored on the memory and executable by the processor to: receive a request for credential from the Service IDM entity, the request comprising a plurality of identities; generate a new identity (ID) for each of the plurality of identities; transmit the new IDs to the KMC; receive a plurality of secret keys from the KMC, each of the plurality of secret keys correspond to one of the plurality of identities; transmit the plurality of new IDs and plurality of secret keys to the Service IDM entity;

the Service IDM entity comprises a processor, a memory, and instructions stored on the memory and executable by the processor to: transmit a plurality of IDs to the User IDM; receive the plurality of new IDs and the plurality of secret keys from the User IDM; distribute the plurality of new IDs and the plurality of secret keys to the authentication server and devices;

the KMC comprises a processor, a memory, and instructions stored on the memory and executable by the processor to: receive the new ID from the Network IDM, generate the secret key, transmit the secret key to the Network IDM; and receive the plurality of new IDs from the User IDM, generate the plurality of secret keys, transmit the plurality of secret keys to the Network IDM.

In accordance with an embodiment of the disclosure, the instructions of the KMC to receive the new ID from the Network IDM, generate the secret key, transmit the secret key to the Network IDM further comprises instructions to: determine the pair of global keys from a plurality of pairs of global keys, and generate the secret key for the new ID with the determined pair of global keys. In yet another embodiment, the KMC repeats the steps of determining the pair of global keys from the plurality of pairs of global keys to determine a next pair of global keys from the plurality of pairs of global keys, and generating another secret key for the new ID to obtain a plurality of secret keys for the new ID. The KMC then transmits the plurality of indexes associated to the pairs of global keys used for generating the secret keys.

In accordance with an embodiment of the disclosure, the instructions of the KMC to receive the plurality of new IDs from the User IDM, generate the plurality of secret keys, transmit the plurality of secret keys to the Network IDM further comprises instructions to: determine the pair of global keys from a plurality of pairs of global keys, and generate the secret key for the new ID with the determined pair of global keys. In yet another embodiment, the KMC repeats the steps of determining the pair of global keys from the plurality of pairs of global keys to determine a next pair of global keys from the plurality of pairs of global keys, and generating another secret key for each of the plurality of new IDs to obtain a plurality of secret keys for each of the plurality of new IDs. The KMC then transmits the plurality of indexed associated to the pairs of global keys used for generating the secret keys.

In accordance with an embodiment of the disclosure, the new ID generated by the Network IDM is by combining the identity of the authentication entity and an expiry date and/or time of the identity of the authentication entity. In another embodiment, the new ID generated by the Network IDM is by combining the identity of the authentication entity and the index of the GPK used in key generation.

In accordance with an embodiment of the disclosure, the secret key is generated by the KMC by using the new identity, a predetermined pair of global keys, namely Global Public Key (GPK) and Global Secret Key (GSK), together with Identity Based Cryptography (IBC) key generation algorithm.

In accordance with another aspect of the disclosure, a key generation and distribution system for an authentication framework for an operating provider network comprising an authentication entity and a service provider network comprising an authentication server is provided in the following manner. The key generation and distribution system comprises: a Key Management Center (KMC) residing at the operating provider network; and a Service IDM entity residing at the service provider network, wherein the Service IDM entity comprises a processor, a memory, and instructions stored on the memory and executable by the processor to: transmit a plurality of IDs to the KMC; receive a plurality of new IDs and a plurality of secret keys from the KMC; distribute the plurality of new IDs and the plurality of secret keys to the authentication server and devices; the KMC comprises a processor, a memory, and instructions stored on the memory and executable by the processor to: receive a new ID from the authentication entity, generate a secret key, transmit the new ID and secret key to the authentication entity; and receive the plurality of IDs from the Service IDM entity, generate the plurality of new IDs and the plurality of secret keys, transmit the plurality of new IDs and the plurality of secret keys to the Service IDM entity.

In accordance with an embodiment of the disclosure, the instructions from the KMC to receive the new ID from the authentication entity, generate a secret key, transmit the new ID and secret key to the authentication entity further comprises instructions to: determine the pair of global keys from a plurality of pairs of global keys, and generate the secret key for the new ID with the determined pair of global keys. In yet another embodiment, the KMC repeats the steps of determining the pair of global keys from the plurality of pairs of global keys to determine a next pair of global keys from the plurality of pairs of global keys, and generating another secret key for the new ID to obtain a plurality of secret keys for the new ID. The KMC then transmits the plurality of indexes associated to the pairs of global keys used for generating the secret keys.

In accordance with an embodiment of the disclosure, the instructions from the KMC to receive the plurality of IDs from the Service IDM entity, generate the plurality of new IDs and the plurality of secret keys, transmit the plurality of new IDs and the plurality of secret keys to the Service IDM entity further comprises instructions to: determine the pair of global keys from a plurality of pairs of global keys, and generate the secret key for the new ID with the determined pair of global keys. In yet another embodiment, the KMC repeat the steps of determining the pair of global keys from the plurality of pairs of global keys to determine a next pair of global keys from the plurality of pairs of global keys, and generating another secret key for each of the plurality of new IDs to obtain a plurality of secret keys for each of the plurality of new IDs. The MNC then transmits the plurality of indexed associated to the pairs of global keys used for generating the secret keys.

In accordance with an embodiment of the disclosure, the new ID generated by the KMC is by combining the identity of the authentication entity and an expiry date and/or time of the identity of the authentication entity. In another embodiment, the new ID generated by the Network IDM is by combining the identity of the authentication entity and the index of the GPK used in key generation.

In accordance with an embodiment of the disclosure, the secret key is generated by the KMC by using the new identity, a predetermined pair of global keys, namely Global Public Key (GPK) and Global Secret Key (GSK), together with Identity Based Cryptography (IBC) key generation algorithm.

In accordance with an embodiment of the disclosure, each of the plurality of secret keys corresponds to one of the plurality of new IDs.

In accordance with another aspect of the disclosure, a key generation and distribution system for an authentication framework for an operating provider network comprising an authentication entity and a service provider network comprising an authentication server is provided in the following manner. The key generation and distribution system comprises: a Key Management Center (KMC) residing at the operating provider network; and a Service IDM entity residing at the service provider network, wherein the Service IDM entity comprises a processor, a memory, and instructions stored on the memory and executable by the processor to: transmit a request for secret keys to the KMC; receive a Service identity (ID) and a plurality of secret keys from the KMC; generate and transmit new IDs and new secret key to one of the authentication server and devices;

the KMC comprises a processor, a memory, and instructions stored on the memory and executable by the processor to: receive a new ID from the authentication entity, generate a secret key, transmit the new ID and secret key to the authentication entity; and receive the request for secret keys from the Service, generate the Service ID and the plurality of secret keys, transmit the Service ID and the plurality of secret keys to the Service IDM entity and transmit the Service ID to the authentication entity.

In accordance with an embodiment of the disclosure, the new ID generated by the Service IDM is by combining the identity of the authentication server and an expiry date and/or time of the identity of the authentication server. In another embodiment, the new ID generated by the Service IDM is by combining the identity of the authentication server and the index of the GPK used in key generation.

In accordance with an embodiment of the disclosure, the new ID generated by the Service IDM is by combining the identity of the device and an expiry date and/or time of the identity of the device. In another embodiment, the new ID generated by the service IDM is by combining the identity of the authentication entity and the index of the GPK used in key generation.

In accordance with an embodiment of the disclosure, the Service ID generated by the KMC is by combining the identity of the Service IDM entity and an expiry date and/or time of the identity of the device. In another embodiment, the new ID generated by the service IDM is by combining the identity of the authentication entity and an the index of the GPK used in key generation.

In accordance with an embodiment of the disclosure, the secret key, generated by the KMC, is generated by using the Service ID, a pre-determined pair of global keys, namely Global Public Key (GPK) and Global Secret Key (GSK), together with Identity Based Cryptography (IBC) key generation algorithm.

In accordance with an embodiment of the disclosure, the instruction, of the KMC, to receive the request for secret keys from the Service, generate the Service ID and the plurality of secret keys, transmit the Service ID and the plurality of secret keys to the Service IDM entity and transmit the Service ID to the authentication entity further comprises instructions to: transmit the GPK, and maximum number of new IDs allowed to be generated with the SID to the Service IDM entity.

In accordance with an embodiment of the disclosure, the instructions of the KMC to receive the request for secret keys from the Service, generate the Service ID and the plurality of secret keys, transmit the Service ID and the plurality of secret keys to the Service IDM entity and transmit the Service ID to the authentication entity further comprises instructions to: determine the pair of global keys from a plurality of pairs of global keys, and generate the secret key for the new ID with the determined pair of global keys. In yet another embodiment, the KMC repeats the steps of determining the pair of global keys from the plurality of pairs of global keys to determine a next pair of global keys from the plurality of pairs of global keys, and generating another secret key for each of the plurality of new IDs to obtain a plurality of secret keys for each of the plurality of new IDs. The KMC then transmits the plurality of indexed associated to the pairs of global keys used for generating the secret keys.

BRIEF DESCRIPTION OF THE DRAWINGS

The above advantages and features in accordance with this invention are described in the following detailed description and are shown in the following drawings:

FIG. 2.1 illustrating a distributed identity management and authentication framework 200 in accordance with an embodiment of this disclosure;

FIG. 2.2 illustrating a process on the procedure for generating and distributing IDs and private keys by the framework 200 in accordance with an embodiment of this disclosure;

DETAILED DESCRIPTION

Figure 1:
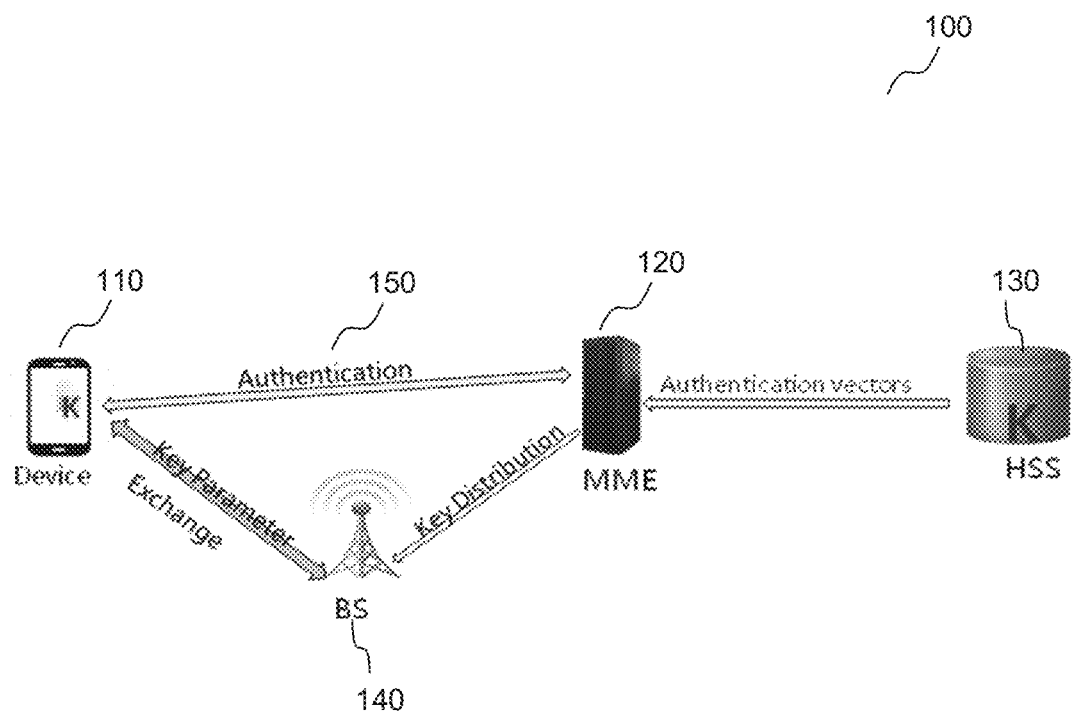
FIG. 1 illustrating an existing user authentication and management framework 100 between users and core network.

This invention relates to a distributed authentication framework based on identity-based cryptography. Particularly, this invention relates to a method and system for generating and distributing keys based on identity-based cryptography.

In this disclosure, we first propose a hierarchical network architecture for IBC-based identity management and key distribution. The hierarchical network architecture includes a key management center (KMC), identity management (IDM) entities for the network and service provider, and authentication entities at both operator and service providers. Based on this hierarchical network architecture, it is proposed that the identity and key distribution procedures to distribute identity and IBC-based private keys be provided by the relevant IDM entities. The IDM entity of the service provider further distributes the identity and IBC-based private keys to the devices and its own authentication server. The IBC-based identity and private keys can be used for both network access authentication and service authentication.

To increase robustness of the IBC-based system, it is further proposed that the key generation entity may generate multiple private keys for a single ID and device may use private keys for the same ID in authentications. In deployment, the IDM entities of service provider are allowed to generate IDs and private keys based on their need. To limit the number ID and private key being generated by the IDM entity of service provider, it is also proposed that a quota is provided to limit the number of IDs and private keys that can be generated.

As mentioned above, the centralized identity and authentication framework adopted by the current LTE network is not suitable for the Internet of Things (IOT) devices as the management cost incurred by such a framework is very high. To simplify the identity management and authentication framework, it is proposed to provide a distributed identity management and authentication framework based on the IBC-based technology. FIG. 2.1 illustrates an embodiment of the framework 200 proposed. In this framework 200, the operator provider network 210 comprises a Key Management Center (KMC) 213, a base station 215 and other servers or databases such as Serving Gateway 218 and PDN Gateway 219. The service provider network 220 comprises a Service IDM entity 225 and an Authentication Server 228.

The KMC 213 is responsible for generating the identity (ID) and private key (SK). The KMC 213 generates ID and private keys based on the IBC technology. Once generated, KMC 213 distributes the ID and keys to the Service IDM entity 225. After the Service IDM entity 225 receives the ID and keys from the KMC 213, the Service IDM entity 225 distributes the IDs and keys to its own devices 110 and also its authentication server 228. In one embodiment, the Service IDM entity 225 generates further keys to be distributed to the devices 110 and Authentication Server 228. In another embodiment, a limitation on the number of further keys that may be generated by the Service IDM entity 225 is implemented. In yet another embodiment, the KMC 213 may also distribute the IDs and keys to an IDM entity or authentication entities belonging to the operator provider network.

In order for the device 110 to gain access to the network, the device 110 performs mutual authentication with the operator provider network 210 via the base station 215. For service level authentication, the device 110 may further perform mutual authentication with authentication server 228.

FIG. 2.2 illustrates a process 250 showing the general procedure for generating and distributing IDs and private keys by the framework 200 as shown in FIG. 2.1. Process 250 begins with step 255 where the KMC 213 generates ID and private keys based on the IBC technology. Particularly, the KMC 213 first generates IDs either based on the ID list received from the service provider or IDs based on its own configuration. With the generated IDs, the KMC 213 generates private keys for each ID based on the IBC technology. To generate private keys for a given ID, the KMC 213 use a pair of IBC-based root keys, GPK and GSK. The KMC is responsible for generating ID and private keys for both service provider's devices and network authentication entity of the operator. In another embodiment, the KMC may generate a few Service IDs (SIDs) and keys for the service provider so that the service provider can further generate keys for its devices 225 and authentication server 228 based on the SIDs and keys. Further details will be described below.

In step 260, the KMC distributes the generated IDs, corresponding private keys (SK) and global public key (GPK) to the Service IDM entity 225 of the service provide network 220 and an authentication entity of the Operator Provider Network 210. For this framework, the authentication entity of the Operator Provider Network 210 may be the base station 215. In another embodiment, the KMC 213 may distribute the generated IDs and corresponding private keys (SK) and GPK to an IDM entity or authentication entities belonging to the operator provider network. The authentication entities use the generated IDs and corresponding private keys (SK) and GPK to perform mutual authentication with the device 110.

In step 265, the Service IDM entity 225 receives batch of IDs, private keys (SKs) corresponding to the IDs, and the global public key (GPK) from the KMC 213 and further distributes the IDs and private keys, and GPK to its own devices 110 through a secure tunnel. Optionally, the IDM entity 225 sends some IDs, corresponding private keys and GPK to its own authentication server 228. In another embodiment, the Service IDM entity 225 generates new keys based on the SIDs and keys received from the KMC 213, and distributes the IDs and new keys to its devices 225 and authentication server 228.

In step 270, in order for the device 110 to gain access to the network, the device 110 performs mutual authentication with the base station 215 using the ID, private key (SK) and GPK received from the Service IDM entity 225. For service level authentication, the device 110 may further perform mutual authentication with authentication server 228. Particularly, the base station 215 forwards the authentication request to the authentication server 228.

When the device 110 wants to access the network, the device generates a message which contains a signature derived with the SK and GPK. The device 110 then sends the message to the authentication entity of the operator provider network. The operator provider network then authenticates the device 110 based on the signature received by using the device ID received, the GPK stored previously, and a predefined IBC-based algorithm. If the authentication is success, the authentication entity at the network side generates another message with its own ID, the corresponding private key and GPK. Then the authentication entity transmits the message to the devices 110. The device 110 authenticates the network in a similar way as network authenticates the UE.

Figure 3:
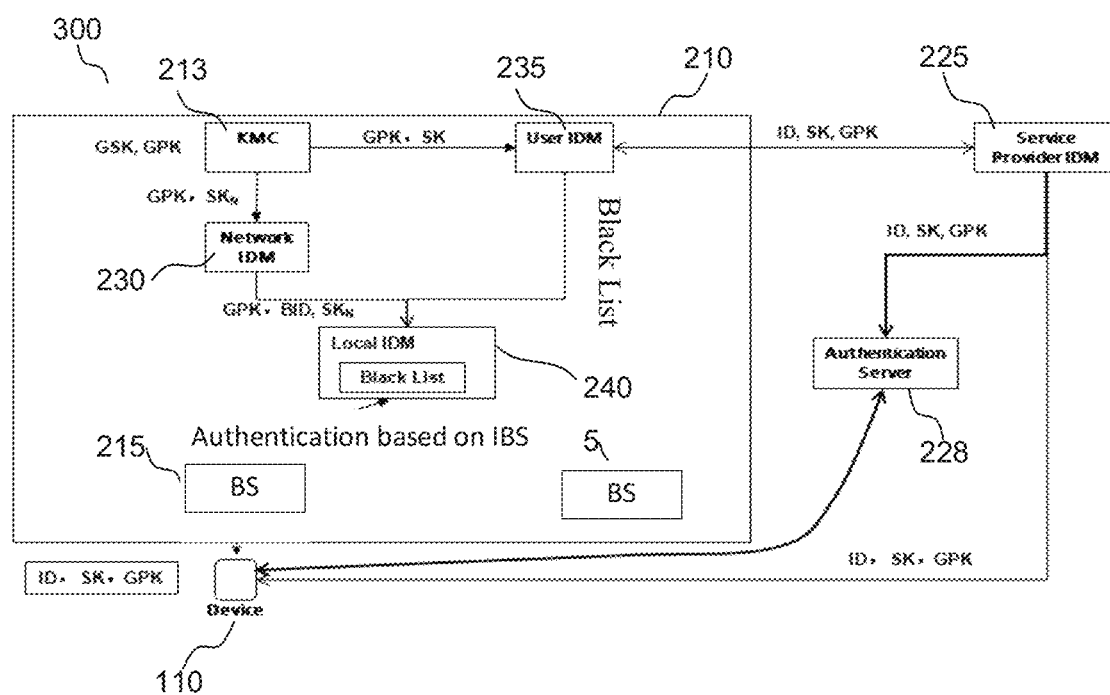
FIG. 3 illustrating another distributed identity management and authentication framework 300 in accordance with an embodiment of this disclosure.

FIG. 3 illustrates another framework 300. In the framework 300, two additional IDM entities, namely User IDM 235 and Network IDM 230 are provided.

The User IDM 235 is responsible for receiving request from service IDM entity 225 and generating a given number of IDs based on the request. The User IDM 235 then sends the generated IDs to the KMC 213 for key generation. The KMC 213 then generates SK for the received IDs and then sends the IDs, SKs, together with the GPK, to the User IDM 235 and in turn the User IDM 235 sends the IDs, SKs, GPK to the service IDM entity 225. Another function of the User IDM 235 is to accept a black list, containing IDs that shall be excluded from the authentication, from service provider IDM 225. User IDM 235 further forwards the black list to the authentication entity such as a base station 215 directly or via a local IDM 240.

The network IDM 230 has a similar function as the user IDM 235. Particularly, the network IDM 230 generates the IDs for the network side authentication entity and sends the IDs to the KMC 213. The KMC 213 in response to receiving the IDs from the network IDM 230, generates SKs based on the IBC technology with preconfigured GSK, GPK. The KMC 213 then sends back the generated SKs and GPK to the network IDM 230 and the network IDM further sends the ID, SKs, and GPK to the network authentication entity such as the local IDM 240. The network authentication entity uses the ID, SKs and GPK performs mutual authentication with the devices.

The Local IDM 240 performs mutual authentication with the user device 110 and generates session keys for sending and transmitting data with the gateways. The Local IDM 240 may also maintain a black list for exclude devices from accessing the network.

One skilled in the art will recognize that instead of using the local IDM 240 as a network authentication entity, the network authentication entity may be the base station 215 instead.

It is noted that the mutual authentication performed between the devices 110 and the authentication entity of the operator provider network 210 is not important to the current disclosure. Hence, a detailed description on the procedure for mutual authentication will not be described herein. Further details pertaining to the framework 200 and 300 will be described below.

A brief description on Identity-based cryptography (IBC) will be provided as follows. An IBC is a type of public-key cryptography in which a public key is a known string such as an email address, phone number, domain name, or a physical IP address. For an IBC-based system, a key generator can generate a private key (SKID) for any given ID based on a given Global Public Key (GPK) and Global Secret Key (GSK). The generated private key SKID is distributed to an entity (E) together with GPK and the ID. The entity (E) can be an IOT device, or a base station (BS).

When an entity X wants to authenticate with entity Y, entity X generates a random number first and further generates a signature for the random number with the SKID and GPK based on a known algorithm. Then entity X sends a message with the random number, the signature and its ID to entity Y. After receiving the message, entity Y authenticates the entity X with the received random number, signature, ID of entity X, and the GPK based on a known algorithm. If the verification is successful, entity Y further authenticates with entity X. Similarly, the entity X can also authenticate entity Y with its signature and ID of entity Y.

In light of the above, we can observe that an advantage of the IBC-based authentication is that it does not need a centralized server to preserve the credentials of devices in authentication.

Figure 4:
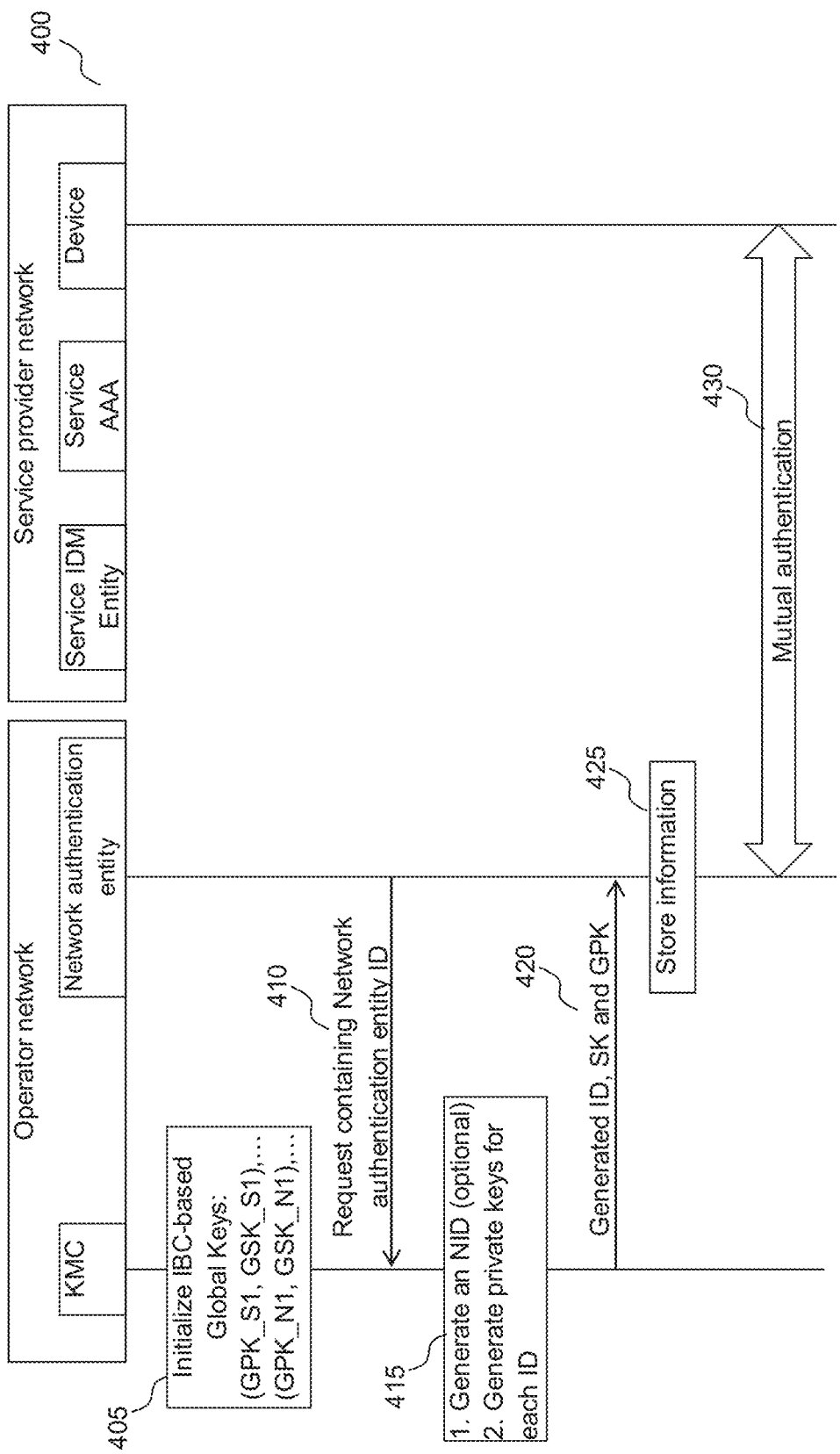
FIG. 4 illustrating a process 400 for distributing ID and credentials to a network authentication entity in accordance with the framework 200 in accordance with an embodiment of this disclosure.

FIG. 4 illustrates a process 400 for a KMC 213 distributing IBC-based ID and credentials to a network authentication entity such as a base station (BS) in accordance with the framework 200.

Process 400 begins with step 405 where the KMC initializes IBC-based global keys. In one embodiment, there could be only one pair of the global keys, namely Global Public Key (GPK) and Global Secret Key (GSK). Particularly, the KMC generates secret keys for the service provider and network authentication entity based on the same pair of global keys (i.e. GPK and GSK). In another embodiment, the KMC 213 may initialize multiple pairs of the IBC-based global keys expressed in the following manner, (GPK_S1, GSK_S1), (GPK_S2, GSK_S2), (GPK_Sn, GSK_Sn)
(GPK_N1, GSK_N1), (GPK_N2, GSK_N2), . . . (GPK_Nn, GSK_Nn)

where GPK refers to Global Public Key, GSK refers to Global Secret Key, S1 . . . Sn refers to the first to n pairs of global keys for the service provider and N1 . . . Nn refers to the first to n pairs of global keys for network authentication entity. The KMC 213 may own multiple pairs of Global Public Key and Global Secret Key (GPK, GSK) for both service provider 220 and network provider 210. When KMC 213 is configured with multiple pairs of GPK and GSK, an index may be assigned to each pair of the global keys to identify the pair.

In step 410, the network authentication entity sends a request/message to the KMC 213 to request for IDs, SKs, and GPK for authenticating a device. The request/message may contain information to identify the network authentication entity such as an identity of the network authentication entity, NAE_ID, or a location of the network authentication entity.

In step 415, in response to receiving the request/message from the network authentication entity in step 410, the KMC generates IDs for the request first. In an embodiment, the generated IDs may be a combination of the received IDs with an expiry date and/or time of the IDs and its private keys. In another embodiment, the generated IDs may be a combination of the received IDs and an index of the GPK to be used in key generation. In particular, the KMC first determines one of more pair of global keys to be used for generating the secret key or secret keys prior to generating the IDs. One skilled in the art will recognize that other combination of information may be implemented to generate the IDs without departing from the disclosure. Thereafter, the KMC 213 use the generated ID, the predetermined pair of global keys (GSK, GPK), together with the given IBC key generation algorithm to generate SK for the generated ID. In one embodiment, if only one pair of GPK and GSK is used for key generation, the KMC only generate one SK for each ID. In particular, the KMC determines a pair of global keys from multiple pairs of global keys, and subsequently generates the secret key for the generated ID with the determined pair of global keys. In another embodiment, if multiple pairs of GPK and GSK are being configured for key generation, the KMC may generate multiple SKs for each ID. In particular, the KMC repeats the steps of determining the pair of global keys from the multiple pairs of global keys to determine a next pair of global keys, and subsequently generating another secret key for the generated ID to obtain a multiple secret keys for the generated ID. Alternatively, all the global keys to be used for generating the secret keys are determined prior to generating the new IDs. IBC key generation algorithm are widely known and hence will not be described in detailed in this disclosure.

In step 420, the KMC sends a message to the Network Authentication Entity/BS. The message contains the generated ID, SK generated for the ID, GPK used for key generation in the operator network (i.e. GPK_N). The message may also include the GPKs that the network authentication entity requires for authenticating with the devices 110 (i.e. GPK_S). When multiple pairs of global keys (GPK, GSK) are used in the key generation for either the network provider or service provider, the KMC 213 shall also include the index of the GPKs (that has been used for generating the secret keys) in the message.

In step 425, after receiving the ID, corresponding SK, GPK used for key generation in the operator network (GPK_N), GPK for device authentication (GPK_S), and their index if included in the message, the network authentication entity stores the received ID and SK and GPKs (GPK_S, GPK_N), and their index in its memory. In one embodiment, the network authentication entity is a server in the core network, for example, an AAA server. In another embodiment, the Network Authentication Entity can be an entity or module inside a base station.

In step 430, the network authentication entity uses the ID, SK, GPKs and their index stored in its memory for mutual authentication with devices 110 that intend to join the network. Process 400 ends after step 430.

Figure 5:
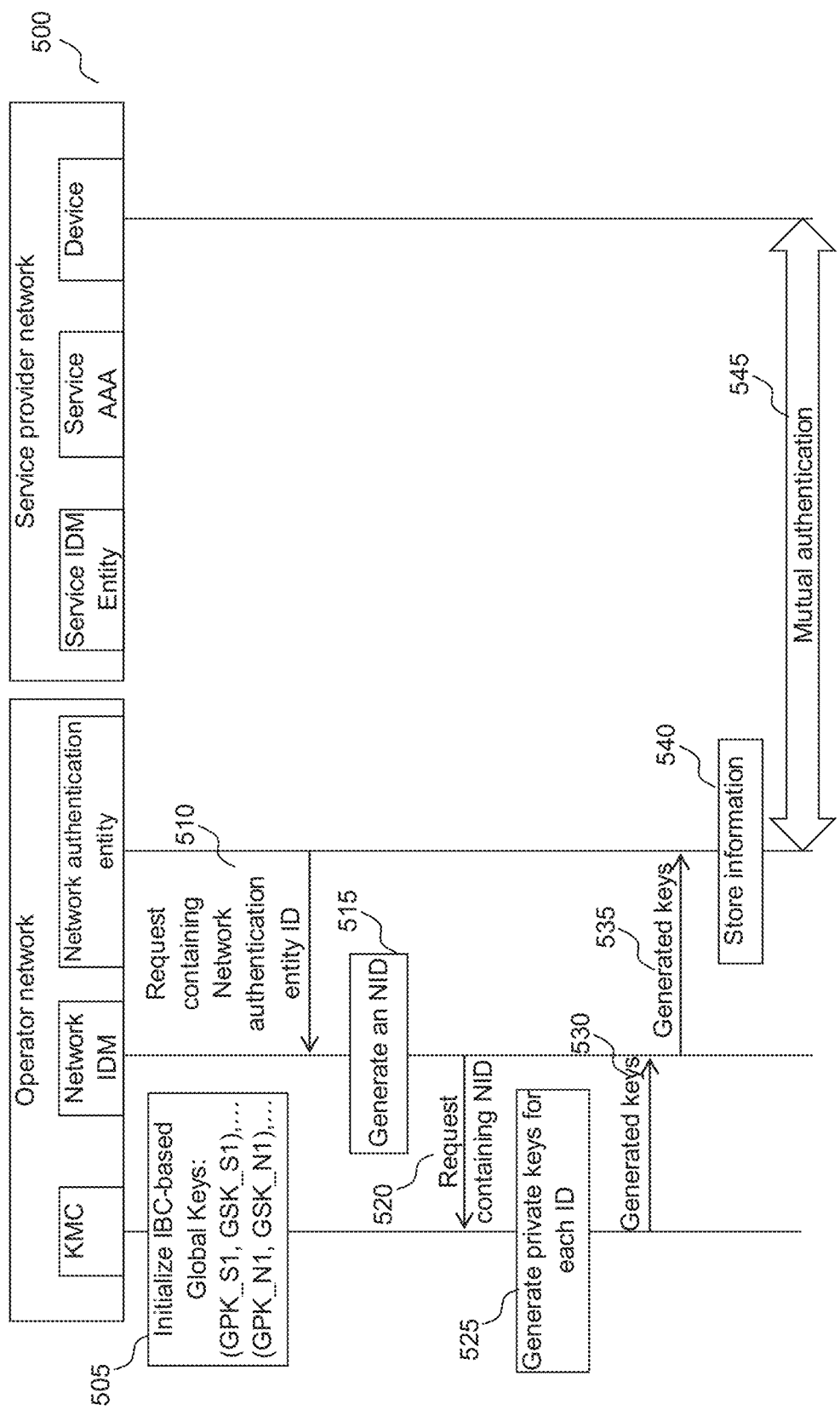
FIG. 5 illustrating a process 500 for distributing IDs and credentials to the network authentication entity in accordance with the framework 300 in accordance with an embodiment of this disclosure.

FIG. 5 shows an alternative process 500 for the KMC to distribute the IDs and SKs to the network authentication entity in accordance with the framework 300. Particularly, a Network IDM entity is placed between KMC and network authentication entity. The function of having a Network IDM entity between the KMC and the network authentication entity is to receive the request/message from the network authentication entity and generate identity. After that, the network IDM entity further sends another request to the KMC for private key (SK) generation.

Process 500 begins with 505 where the KMC initializes IBC-based global keys. This is similar to step 405 in process 400.

In step 510, the Network Authentication Entity/BS sends a request/message for identity (ID) and authentication keys to the network IDM 230. The request/message shall include an identity of network authentication entity such as NAE_ID and other information to identify the network authentication entity.

In step 515, in response to receiving the request/message from the Network Authentication Entity, the network IDM Entity 230 generates an ID, denoted as NID. The Network IDM Entity then sends a message/request with the NID to the KMC 213 for private key (SK) generation in step 520. The NID can either be the original ID received from the Network Authentication Entity or a combination of the ID of Network Authentication Entity and expiry date and/or time of the IDs. One skilled in the art will recognize that other combination of information may be implemented to generate the NIDs without departing from the disclosure.

In step 525, in response to receiving the NID from the network IDM Entity 230, the KMC 213 uses the NID, the predetermined pair of global keys (GSK, GPK), together with the given IBC key generation algorithm to generate private key (SK) for the NID. In particular, the KMC determines a pair of global keys from multiple pairs of global keys, and subsequently generates the secret key for the NID with the determined pair of global keys. If multiple pairs of GPK and GSK are configured for generating private keys, the KMC 213 generates multiple SKs for each NID. In particular, the KMC repeats the steps of determining the pair of global keys from the multiple pairs of global keys to determine a next pair of global keys, and subsequently generating another secret key for the NID to obtain a multiple secret keys for the NID.

In step 530, the KMC sends a message to the Network IDM 230. The message includes the SKs generated for the NID, and GPKs used for key generation in the operator network (i.e. GPK_N). The message may also include the GPKs that the network authentication entity needs for authenticating with the devices 110 (i.e. GPK_S). When multiple pairs of global keys (GPK, GSK) are used in the key generation for either the network provider or service provider, the KMC 213 shall also include the index of the GPKs (that has been used for generating the secret keys) in the message.

In step 535, in response to receiving the corresponding SKs, the GPKs used for key generation in the operator network (GPK_N), GPKs for authenticating with the devices 110 (GPK_S), and their index if included in the message, the Network IDM 230 forwards the NID, corresponding SKs, GPKs used for key generation in the operator network, GPKs for authenticating with the devices 110, and the index (if available) to the network authentication entity.

In step 540, the network authentication entity/BS stores the received NID, corresponding SKs, GPKs used for key generation in the operator network, GPKs for authenticating with the devices 110, and the index (if available).

In step 545, the network authentication entity uses the IDs, SKs, GPKs and their index stored in its memory for mutual authentication with devices that intend to join the network. Process 500 ends after step 545.

Figure 6:
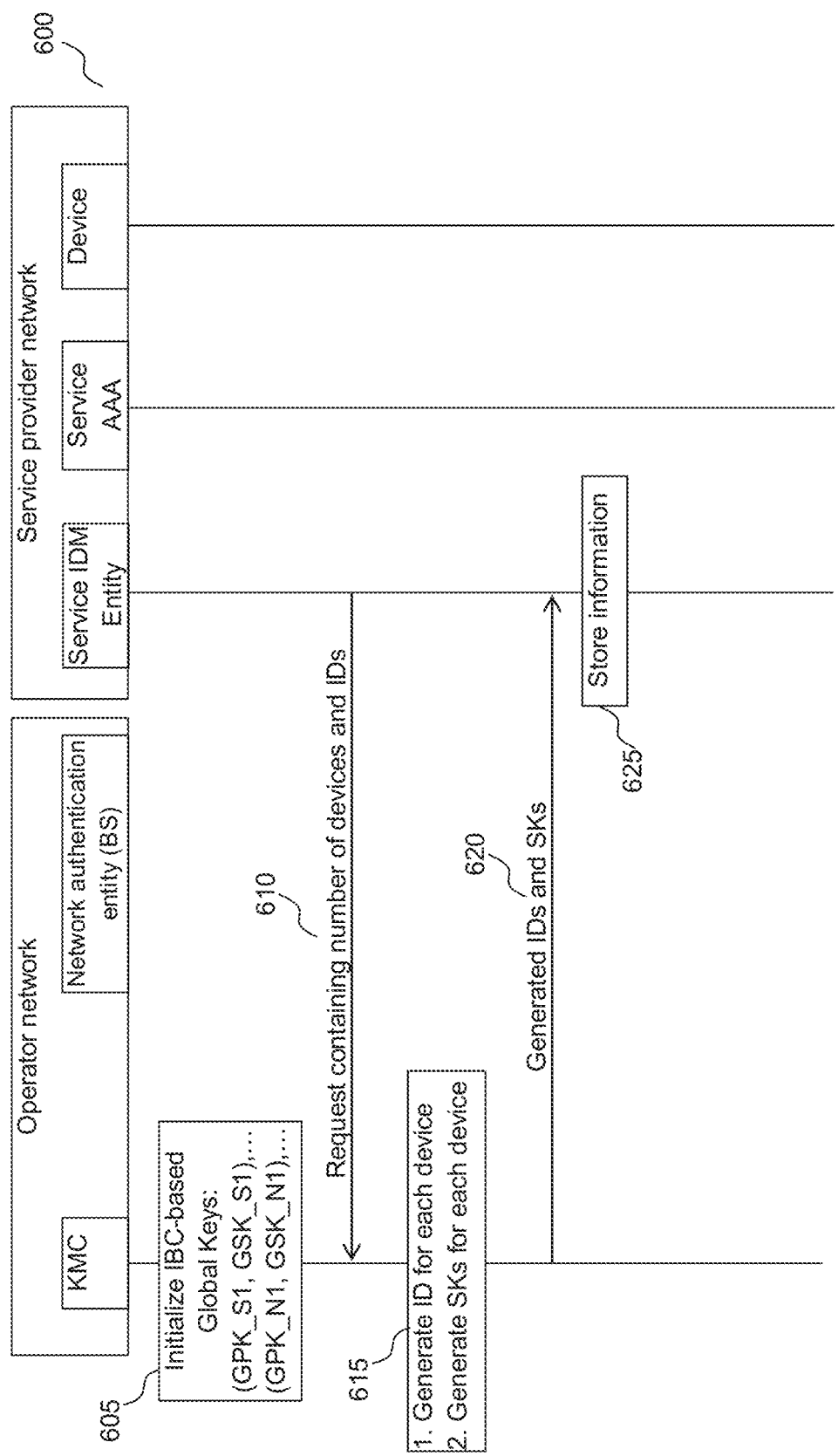
FIG. 6 illustrating a process 600 for distributing IDs and credentials to user devices in accordance with the framework 200 in accordance with an embodiment of this disclosure.

FIG. 6 shows a process 600 for a KMC distributing the IDs and keys to the user devices and the service AAA through a service IDM entity/server where the user devices, Service AAA and service IDM entity/server belong to the same service provider network. This is in accordance with the framework 200.

Process 600 begins with step 605 where the KMC initializes IBC-based global keys, namely a pair of GPK and GSK. This is similar to step 405 in process 400.

In step 610, the service IDM entity 225 sends a request/message to the KMC to obtain ID and SKs for its devices. The request may include information such as number of IDs required and/or a list of physical IDs extracted from the devices.

In step 615, in response to receiving the request/message from the service IDM entity 225 in step 610, the KMC 213 generates a number of IDs based on the information from the request. In an embodiment, the generated IDs may be a combination of the received physical IDs with an expiry date and/or time of the physical IDs and its private keys. In another embodiment, the generated IDs may be a combination of the received physical IDs and an index of the GPK to be used in key generation. In particular, the KMC first determines one of more pair of global keys to be used for generating the secret key or secret keys prior to generating the IDs. One skilled in the art will recognize that other combination of information may be implemented to generate the IDs without departing from the disclosure. For each generated ID, the KMC use the generated ID, the predetermined GSK, GPK, together with the given IBC key generation algorithm to generate SKs for the generated IDs. In one embodiment where only one pair of GPK and GSK is used for key generation, the KMC generates one SK for each ID. Alternatively, the KMC first determines a pair of global keys from a multiple pairs of global keys, and subsequently generates the secret key for the generated IDs with the determined pair of global keys. In another embodiment where multiple pairs of GPK and GSK are being configured for key generation, the KMC 213 generates multiple SKs for each ID. In particular, the KMC repeats the steps of determining a pair of global keys from the multiple pairs of global keys to determine a next pair of global keys from the multiple pairs of global keys, and subsequently generating another secret key for each of the generated IDs to obtain a multiple secret keys for each of the generated IDs. Alternatively, all the global keys to be used for generating the secret keys are determined prior to generating the new IDs.

In step 620, the KMC sends the generated IDs and the corresponding SKs, together with GPKs and their index used in the SK generation to the service IDM entity 225. Each ID may have multiple SKs. For GPKs, they may include GPK for private key generation for the devices 110 (GPK_S), and GPK used for key generation in the operator network (GPK_N). Index associated to the global keys that has been used for generating the secret keys is included if multiple pairs of GPK and GSK are being configured for key generation.

In step 625, the service IDM entity stores the received IDs, SKs, GPKs and the corresponding indexes.

In step 630, the service IDM entity 225 distributes an ID, the corresponding SK, and the GPK which is used in the SK generation, to its service AAA. Service AAA is an entity responsible for mutual authentication with device in service level. If multiple GPKs have been used for SK generation, then an index for the GPK and GSK pair will also be distributed to the service AAA. In step 635, the service AAA entity stores the received ID, the SK, GPK, and the index (if included).

In step 640, the service IDM entity 225 distributes IDs, the corresponding SKs, and the GPK which is used in the SK generation (i.e. GPK_S), to its devices 110, and GPK used for key generation in the operator network (GPK_N) if it is different from the one used for generating SK. If multiple GPKs were used for SK generation, then an index for the GPK and GSK pair will also be distributed to the devices 110.

In step 645, in response to receiving the information from the service IDM entity 225 in step 640, the devices 110 store the received ID, the SK, GPK, and index (if included). If the GPK used for generating SK is different from the one used for generating private key for Network Authentication Entity, then both GPKs are stored at the UE.

In step 650, the devices 110 use the ID, SK, and GPK to perform mutual authentication with the Network Authentication Entity for network access with the operator provider network. GPK indexes may be included in the authentication message when multiple (GPK, GSK) are used in the SK derivation for each device ID or NIDs.

In step 655, the devices 110 use the received ID, SK, GPK to perform mutual authentication with the Service AAA for service access with the service provider network. GPK indexes may be included in the authentication message when multiple (GPK, GSK) are used in the SK derivation for each device ID.

Figure 7:
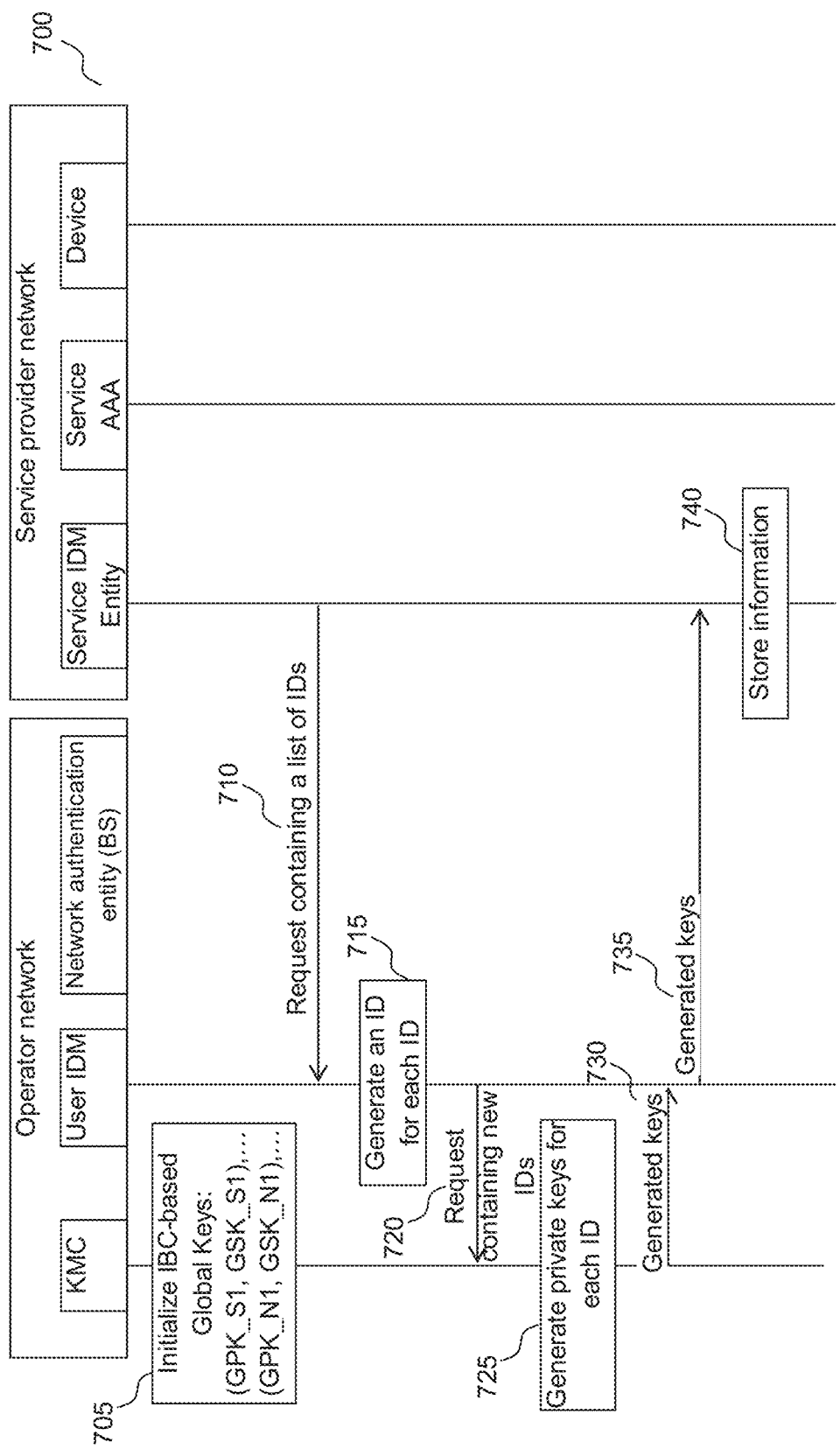
FIG. 7 illustrating a process 700 for distributing IDs and credentials to user devices in accordance with the framework 300 in accordance with an embodiment of this disclosure.

FIG. 7 shows an alternative process 700 for the KMC to distribute the IDs and SKs to user devices in accordance with the framework 300. The difference between this process and process 600 is that a User IDM 235 is placed between KMC 213 and network authentication entity. The User IDM 235 functionality is to receive the request/message from the Service IDM entity 225 and generate identities for the devices. After that, the user IDM 235 sends another request to the KMC for private key (SK) generation.

Process 700 begins with step 705 where the KMC initializes IBC-based global keys, namely a pair of GPK and GSK. This is similar to step 405 in process 400.

In step 710, the service IDM entity 225 sends a request to the user IDM 235 to obtain ID and SKs for its devices. The request may include information such as number of IDs required and/or also a list of physical IDs extracted from the devices.

In step 715, the user IDM 235 generates a number of IDs for the devices based on the information received, including the number of devices and the device physical IDs.

In step 720, the user IDM 235 sends the generated IDs to the KMC for SK generation. Number of IDs is also included in the message/request.

In step 725, for each received ID, the KMC 213 uses the received ID, the predetermined GSK, GPK, together with the given IBC key generation algorithm to generate SK for the received ID. In one embodiment where only one pair of GPK and GSK is used for key generation, the KMC 213 generates one SK for each ID. In particular, the KMC first determines a pair of global keys from a multiple pairs of global keys, and subsequently generates the secret key for the IDs with the determined pair of global keys. In another embodiment where multiple pairs of GPK and GSK are being configured for key generation, the KMC 213 generates multiple SKs for each ID. In particular, the KMC repeats the steps of determining a pair of global keys from the multiple pairs of global keys to determine a next pair of global keys from the multiple pairs of global keys, and subsequently generating another secret key for each of the IDs to obtain a multiple secret keys for each of the IDs In step 730, the KMC 213 sends the generated IDs, corresponding SKs, together with GPKs and their index used in the SK generation to the service IDM entity 225. Each ID may have multiple SKs. For GPKs, they may include GPK for private key generation for the devices 110 (i.e. GPK_S), and GPK used for key generation in the operator network (i.e. GPK_N). Index associated to the global keys that has been used for generating the secret keys is included if multiple pairs of GPK and GSK are being configured for key generation.

In step 735, the user IDM 235 forwards the IDs, corresponding SKs, GPKs and index to the Service IDM entity 225.

In step 740, the service IDM entity 225 stores the received IDs, corresponding SKs, GPKs and index (if available).

In step 745, the service IDM entity 225 distributes an ID, the corresponding SK, and the GPK which is used in the SK generation, to its service AAA. Service AAA is an entity responsible for mutual authentication with device in service level. If multiple GPKs have been used for SK generation, then an index for the GPK and GSK pair will also be distributed to the service AAA. In step 750, the service AAA entity stores the received ID, the SK, GPK, and the index (if included).

In step 755, the service IDM entity 225 distributes IDs, the corresponding SKs, and the GPK which is used in the SK generation (i.e. GPK_N), to its devices 110. If multiple GPKs were used for SK generation, then an index for the GPK and GSK pair will also be distributed to the devices 110.

In step 760, in response to receiving the information from the service IDM entity 225 in step 755, the devices 110 store the received ID, the SK, GPK, and index (if included).

In step 765, the devices 110 use the ID, SK, and GPK to perform mutual authentication with the Network Authentication Entity for network access with the operator provider network. GPK indexes may be included in the authentication message when multiple (GPK, GSK) are used in the SK derivation for each device ID or NIDs In step 770, the devices 110 use the received ID, SK, GPK to perform mutual authentication with the Service AAA for service network access with the service provider network. GPK indexes may be included in the authentication message when multiple (GPK, GSK) are used in the SK derivation for each device ID.

Figure 8:
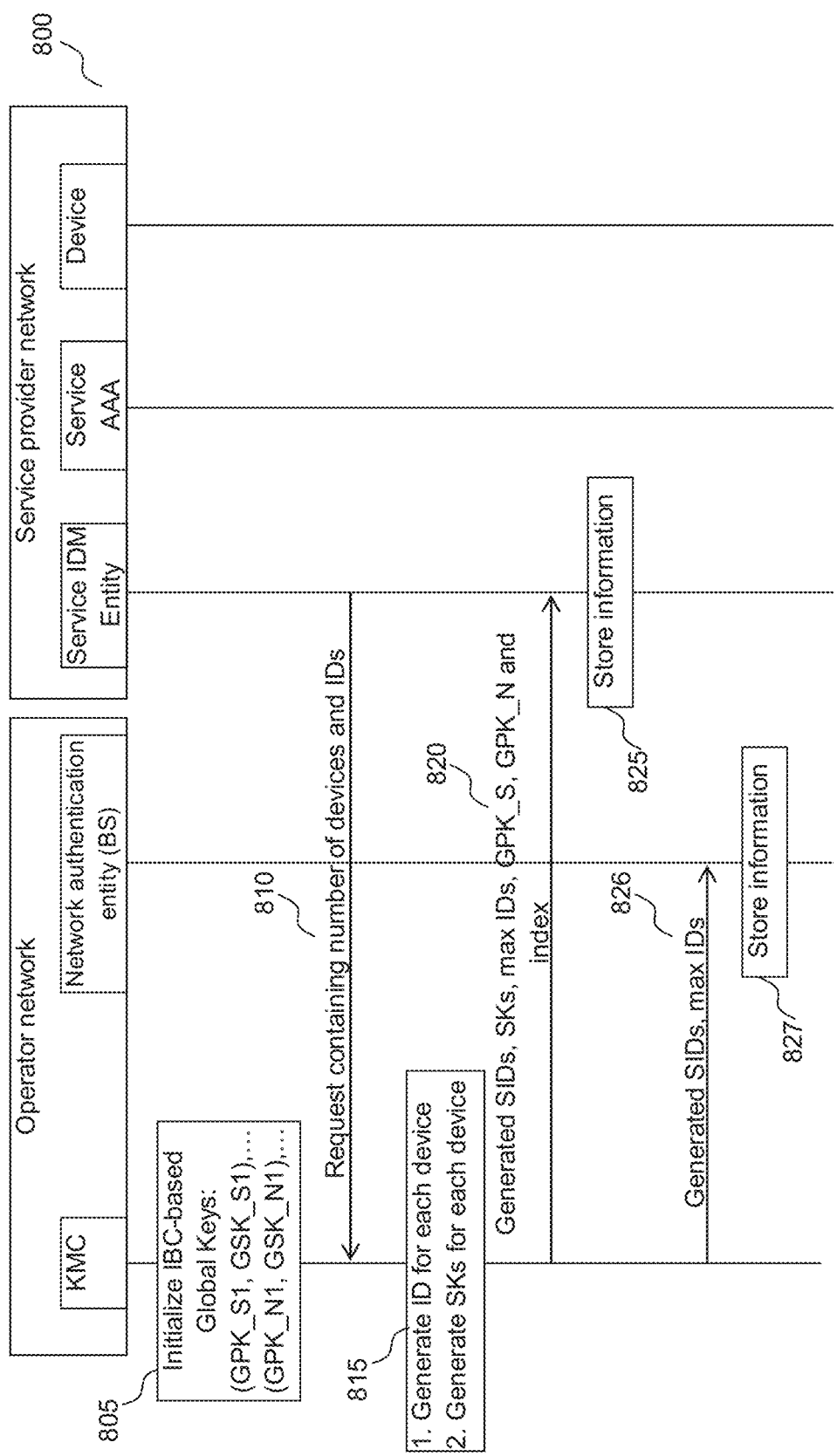
FIG. 8 illustrating a process 800 that provides a procedure for the network operator to control the number of IDs that can be generated by a service operator in accordance with an embodiment of this disclosure.

In processes 600 and 700, only the KMC 213 (together with user or network IDMs) can generate IDs and SKs for the devices while the service IDM Entity 225 is responsible for ID and key distribution. However, with IBC-based technology, to reduce the load at the KMC 213, and increasing the flexibility of the key distribution, the Service IDM entity 225 can also generate IDs and private keys on behalf the KMC 213 using the Hierarchical IBS (HIBS) technology. That is, the Service IDM Entity 225 can use the SK and GPK information received from the KMC and implement an IBC-based key generation algorithm to further generate SKs for its devices as and when required. However, to avoid network congestion, the operator provider network needs to control the number of IDs that can be generated by a service provider network. FIG. 8 illustrates a process 800 that provides a procedure for the operator provider network 210 to control the number of IDs and keys that can be generated by a service provider network 220.

Process 800 begins with step 805 where the KMC initializes IBC-based global keys, namely a pair of GPK and GSK. This is similar to step 405 in process 400.

In step 810, the Service IDM Entity 225 sends a request/message to the KMC 213 to obtain SKs. The Service IDM Entity 225 may indicate the number of IDs it intends to generate.

In step 815, in response to receiving the request/message from the service IDM entity 225, the KMC 213 first generates a service ID, SID. Subsequently, the KMC generates SKs for the SID with the predetermined GPK and GSK pair. Alternatively, the KMC first determines a pair of global keys from a multiple pairs of global keys, and subsequently generates the secret keys for the SID with the determined pair of global keys. If multiple pairs of GPK and GSK are configured, then multiple SKs may be generated for the SID. In particular, the KMC repeats the steps of determining a pair of global keys from the multiple pairs of global keys to determine a next pair of global keys from the multiple pairs of global keys, and subsequently generating another secret key for the SID to obtain a multiple secret keys for the SID.

In step 820, the KMC 213 sends the (1) SID, (2) SKs, (3) GPK, and (4) maximum number of IDs allowed to be generated with this SID and SKs to the Service IDM entity 225. It may also include the GPK used in generating SK for Network Authentication Entity if it is different from the one used for generating the SK for the SID. If multiple pairs of GPK and GSK are used in the SK generation in 815, the index is also included in the message.

In step 825, in response to receiving the message from the KMC 213 in step 820, the Service IDM Entity 225 stores the SID, SKs and GPK.

In step 826, the KMC 213 further sends a message to the Network Authentication Entity. The message includes the SID, maximum number of IDs allowed to access for the SID, and the GPK used in generating the SK. GPK index may be included if multiple pairs of GPK and GSK were used for SK generation in step 815. In response to receiving the message from the KMC 213, the Network Authentication Entity stores the received SID, maximum number of IDs allowed accessing the network under this SID, GPK and its index if included in step 827. One skilled in the art will recognize that steps 820 and 825 may be interchangeable with steps 826 and 827 without departing from the disclosure.

In step 828, the Service IDM Entity 225 generates an ID for Service AAA and corresponding SK using the received SID, SK and GPK. The service IDM Entity 225 subsequently sends the generated ID, SK and GPK to the service AAA in step 830. In response to receiving the information from the service IDM entity, the service AAA stores the received ID, SK, and GPK_S in step 835.

In step 840, the Service IDM Entity 225 generates IDs for devices and corresponding SKs using the received SID, SK and GPK. Subsequently, the service IDM Entity 225 sends the generated IDs, corresponding SKs and GPKs (i.e. GPK_S and GPK_N) to devices 110 in step 842. In response to receiving the information from the service IDM entity, the device stores the received ID, SK, and GPKs in step 845.

In step 850, the device uses the received ID, SK, GPK_N to perform mutual authentication with the Network Authentication Entity for network access. GPK indexes may be included in the authentication message when multiple (GPK, GSK) are used in the SK derivation for each device ID.

In step 855, the device uses the received ID, SK, GPK_S to perform mutual authentication with the Service AAA for service network access with the service provider network. GPK indexes may be included in the authentication message when multiple (GPK, GSK) are used in the SK derivation for each device ID.

With HIBS-based ID and key distribution procedure, another possible method to limit the number of ID that can be generated by Service IDM Entity 225 is by embedding a constraint in the ID format itself. For example, KMC can specify the maximum number of IDs that can be further generated for a given SID. For example, for SID from 1-1000, each SID can generate 10 million IDs. For SID from 1001-10000, each SID can generate 1 million SID etc. This can be done by modifying steps 815-825 as follows.

In step 815, the KMC 213 first generates a few SIDs for service IDM Server according to the number of IDs that Service IDM Entity requested. Then, the KMC 213 embeds a limitation on the number of ID that can be further produced for each SID through the format of the ID. Subsequently, the KMC 213 generates SKs with the predetermined GPK and GSK pair.

In step 820, the KMC 213 sends the generated SIDs, the SKs and GPKs used in the SK generation to the Service IDM Entity. In response to receiving the information from the KMC, the service IDM Entity stores the received SIDs, the SKs and the GPKs.

Details of the processes undertaken by the operator provider network and service provider network will now be described as follows.

Figure 9:
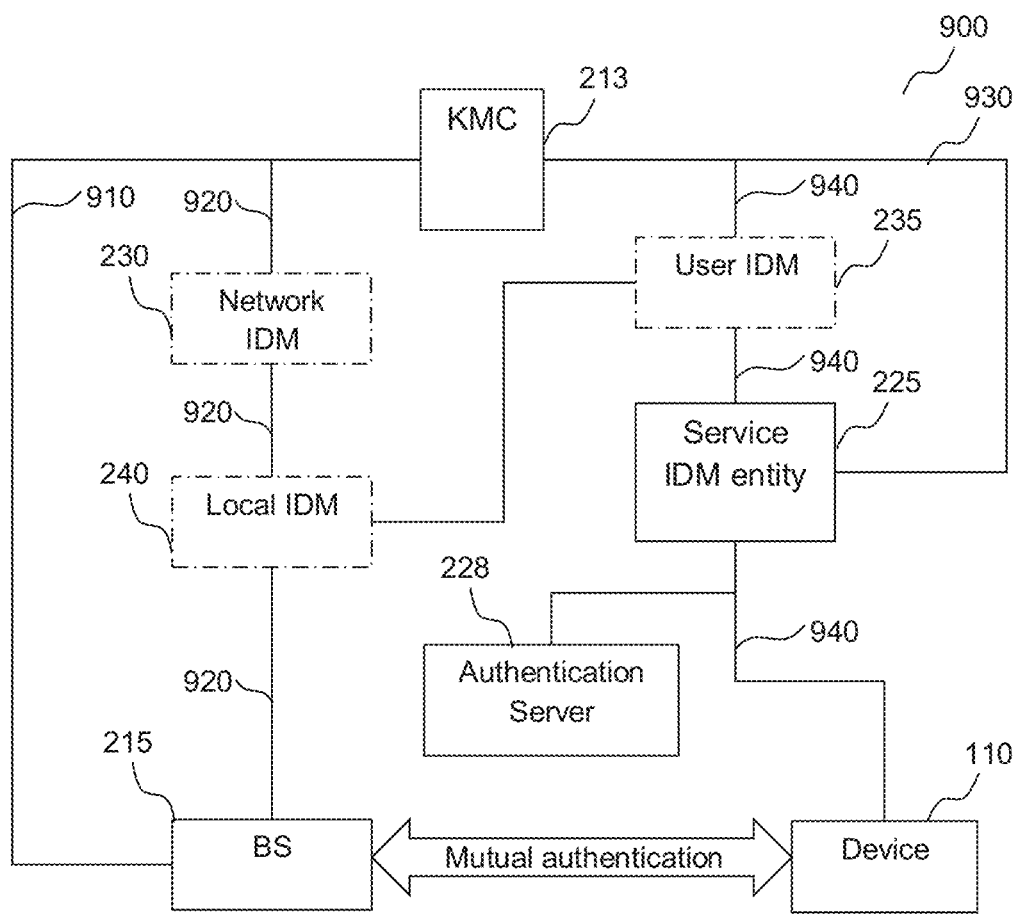
FIG. 9 illustrating the process paths performed by either of the frameworks 200 and 300 in accordance with an embodiment of this disclosure.

FIG. 9 illustrates various process flows performed by either of the frameworks 200 and 300. As described above with reference to FIG. 2.1, the operator provider network 210 of framework 200 comprises a key management center (KMC) 213 and a base station 215 while the service provider network 220 comprises a service IDM entity 225 and an authentication server 228. In framework 300, the operator provider network 210 further comprises a network IDM 230 and a user IDM 235. Further, the framework 300 may further comprises a local IDM 240.

The process 400 illustrates a process for the KMC 213 to distribute IBC-based ID and credentials to a network authentication entity such as a base station (BS) in accordance with the framework 200. This is identified as path 910 in FIG. 9.

The process 500 illustrates a process for the KMC 213 to distribute the IBC-based IDs and SKs to the network authentication entity in accordance with the framework 300. In this process, the network authentication entity may either be the base station 215 or the local IDM 240. This is identified as path 920 in FIG. 9.

The process 600 illustrates a process for the KMC 213 to distribute the IBC-based IDs and keys to the user devices and the authentication server such as service AAA through a service IDM entity 225 in accordance with the framework 200. This is identified as path 930 in FIG. 9.

The process 700 illustrates a process for the KMC 213 to distribute the IBC-based IDs and SKs to user devices in accordance with the framework 300. Particularly, a user IDM 235 is added between the KMC 213 and the service IDM entity 225. This is identified as path 940.

The process 800 illustrates an additional process where the KMC 213 allows the service IDM entity 225 to generate IDs and keys. This can be done through either path 930 or 940.

Further details of the process performed by each of the components will now be described.

Figure 10:
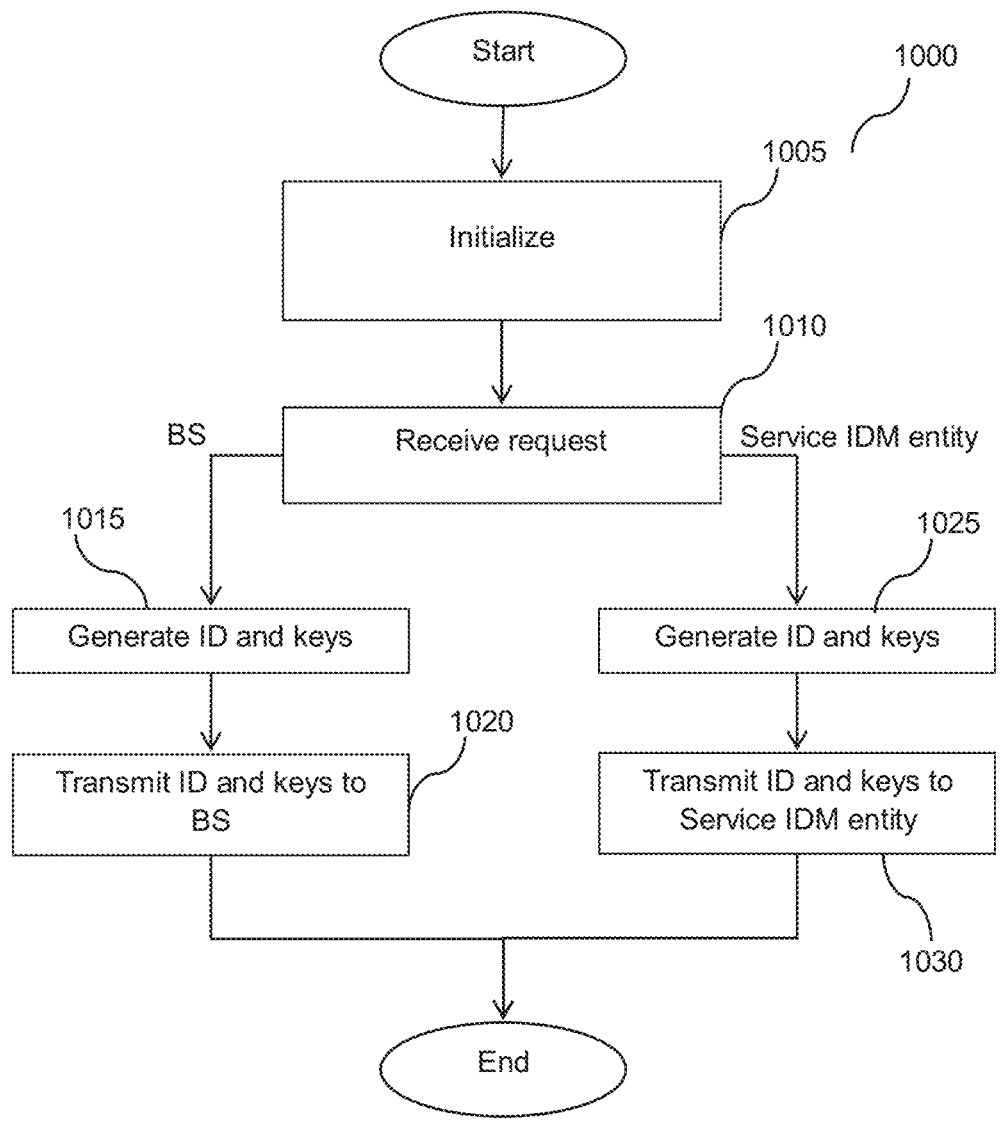
FIG. 10 illustrating a process 1000 performed by the KMC in accordance with framework 200 in accordance with an embodiment of this disclosure.

FIG. 10 illustrates a process 1000 performed by the KMC 213 in accordance with paths 910 and 930 in framework 200. Process 1000 begins with step 1005 where the KMC initializes IBC-based global keys. In one embodiment, there could be only one pair of the global keys, namely Global Public Key (GPK) and Global Secret Key (GSK). Particularly, the KMC generates secret keys for the service provider and network authentication entity based on the same pair of global keys (i.e. GPK and GSK). In another embodiment, the KMC 213 may initialize multiple pairs of the IBC-based global keys expressed in the following manner, (GPK_S1, GSK_S1), (GPK_S2, GSK_S2), (GPK_Sn, GSK_Sn)

(GPK_N1, GSK_N1), (GPK_N2, GSK_N2), (GPK_Nn, GSK_Nn)

where GPK refers to Global Public Key, GSK refers to Global Secret Key, S1 . . . Sn refers to the first to n pairs of global keys for the service provider and N1 . . . Nn refers to the first to n pairs of global keys for network authentication entity. The KMC 213 may own multiple pairs of Global Public Key and Global Secret Key (GPK, GSK) for both service provider 220 and network provider 210. When KMC 213 is configured with multiple pairs of GPK and GSK, an index may be assigned to each pair of the global keys to identify the pair.

In step 1010, process 1000 receives a request and determines whether the request is from either the base station or the service IDM entity. If the request is from the base station, process 1000 proceeds to step 1015. If the request is from the service IDM, process 1000 proceeds to step 1025.

In step 1015, process 1000 generates IDs for the authentication request first. In an embodiment, the generated ID can be either the original ID or a combination of the received ID and expiry time and/or date. In another embodiment, the generated IDs may be a combination of the received IDs and an index of the GPK to be used in key generation. In particular, the KMC first determines one of more pair of global keys to be used for generating the secret key or secret keys prior to generating the IDs. A type field may be included in the ID to indicate that the ID is for service authentication. Thereafter, the KMC 213 use the generated ID, the predetermined pair of global keys (GSK, GPK), together with the given IBC key generation algorithm to generate SK for the generated ID. In one embodiment, if only one pair of GPK and GSK is used for key generation, the KMC only generate one SK for each ID. In particular, the KMC determines a pair of global keys from multiple pairs of global keys, and subsequently generates the secret key for the generated ID with the determined pair of global keys. In another embodiment, if multiple pairs of GPK and GSK are being configured for key generation, the KMC may generate multiple SKs for each ID. In particular, the KMC repeats the steps of determining the pair of global keys from the multiple pairs of global keys to determine a next pair of global keys, and subsequently generating another secret key for the generated ID to obtain a multiple secret keys for the generated ID. Alternatively, all the global keys to be used for generating the secret keys are determined prior to generating the new IDs. IBC key generation algorithm are widely known and hence will not be described in detailed in this disclosure.

In step 1020, the KMC 213 sends a message to the Network Authentication Entity/BS. The message contains the generated ID, SK generated for the ID, GPK used for key generation in the operator network (i.e., GPK_N). The message may also include the GPKs that the network authentication entity requires for authenticating with the devices 110 (i.e. GPK_S). When multiple pairs of global keys (GPK, GSK) are used in the key generation for either the network provider or service provider, the KMC 213 shall also include the index of the GPKs (that has been used for generating the secret keys) in the message.

In step 1025, the KMC 213 generates a number of IDs based on the information from the request. In an embodiment, the generated IDs may be a combination of the received physical IDs with an expiry date and/or time of the physical IDs and its private keys. In another embodiment, the generated IDs may be a combination of the received physical IDs and an index of the GPK to be used in key generation. In particular, the KMC first determines one of more pair of global keys to be used for generating the secret key or secret keys prior to generating the IDs. Subsequently, for each generated ID, the KMC use the generated ID, the predetermined GSK, GPK, together with the given IBC key generation algorithm to generate SK for the generated ID. In one embodiment where only one pair of GPK and GSK is used for key generation, the KMC generates one SK for each ID. In particular, the KMC first determines a pair of global keys from a multiple pairs of global keys, and subsequently generates the secret key for the IDs with the determined pair of global keys. In another embodiment where multiple pairs of GPK and GSK are being configured for key generation, the KMC 213 generates multiple SKs for each ID. In particular, the KMC repeats the steps of determining a pair of global keys from the multiple pairs of global keys to determine a next pair of global keys from the multiple pairs of global keys, and subsequently generating another secret key for each of the IDs to obtain a multiple secret keys for each of the IDs. Alternatively, all the global keys to be used for generating the secret keys are determined prior to generating the new IDs. In another embodiment where the request from the service IDM entity 225 includes an indication on the number of IDs it intends to generate, the KMC 213 first generates a service ID, SID. Subsequently, the KMC generates SKs for the SID using the SID and the predetermined GPK and GSK pair. If multiple pairs of GPK and GSK are configured, then multiple SKs may be generated for the SID.

In step 1030, the KMC 213 sends the generated IDs and the corresponding SKs, together with GPKs and their index used in the SK generation to the service IDM entity 225. Each ID may have multiple SKs. For GPKs, they may include GPK for private key generation for the devices 110 (GPK_S), and GPK used for key generation in the operator network (GPK_N). Index is included if multiple pairs of GPK and GSK are being configured for key generation. In the embodiment where the request from the service IDM entity 225 includes an indication on the number of IDs it intends to generate, the KMC 213 sends the (1) SID, (2) SKs, (3) GPK, and (4) maximum number of IDs allowed to be generated with the SID and SKs to the Service IDM entity 225. It may also include the GPK used in generating SK for Network Authentication Entity if it is different from the one used for generating the SK for the SID. If multiple pairs of GPK and GSK are used in the SK generation, the index is also included in the message. Thereafter, the KMC 213 further sends a message to the Network Authentication Entity. The message includes the SID, maximum number of IDs allowed to access for the SID, and the GPK used in generating the SK. GPK index may be included if multiple pairs of GPK and GSK were used for SK generation. In response to receiving the message from the KMC 213, the Network Authentication Entity stores the received SID, maximum number of IDs allowed accessing the network under this SID, GPK and its index if included.

Process 1000 ends after step 1020 or 1030.

Figure 11:
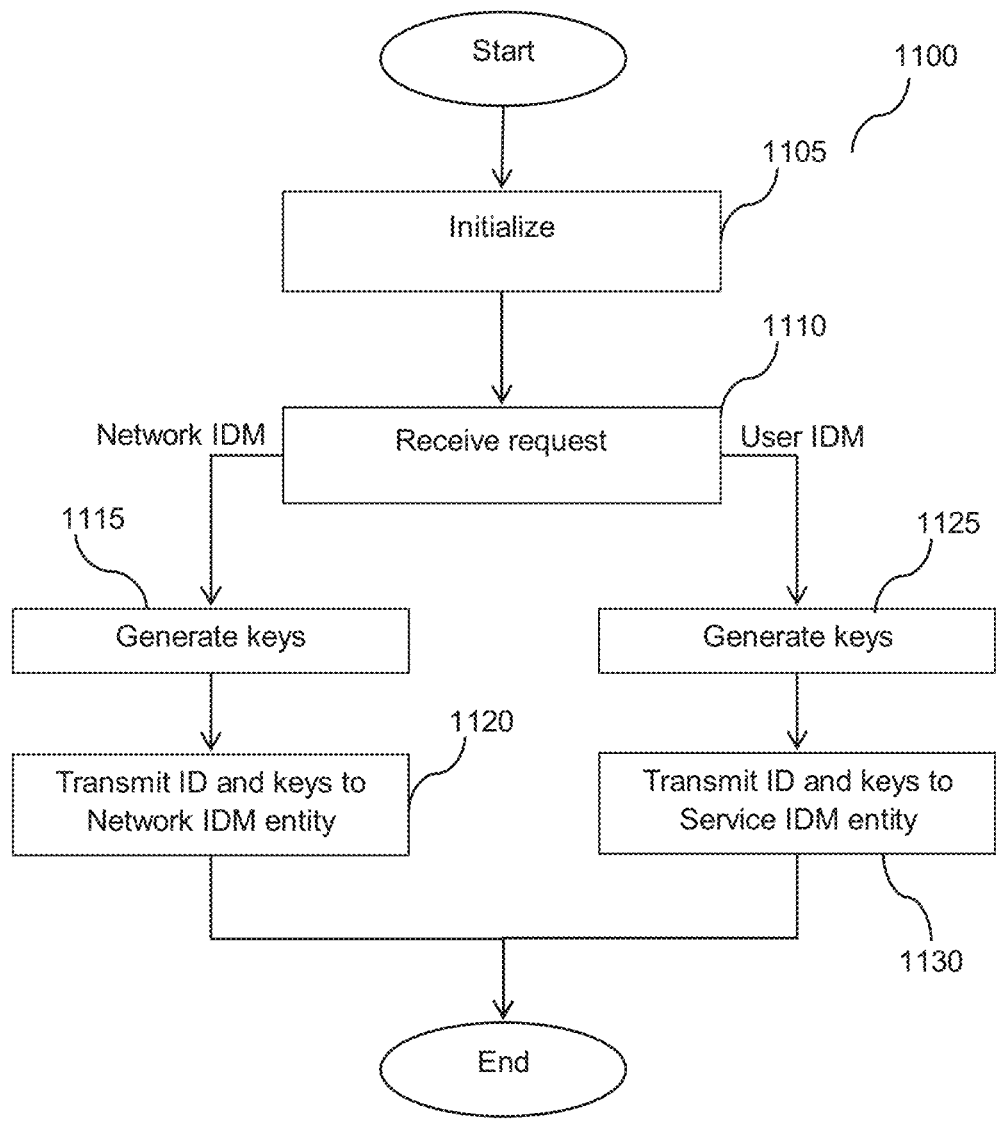
FIG. 11 illustrating a process 1100 performed by the KMC in accordance with framework 300 in accordance with an embodiment of this disclosure.

FIG. 11 illustrates a process 1100 performed by the KMC 213 in accordance with paths 920 and 940 in framework 300. Process 1100 begins with step 1105 where the KMC initializes IBC-based global keys. In one embodiment, there could be only one pair of the global keys, namely Global Public Key (GPK) and Global Secret Key (GSK). Particularly, the KMC generates secret keys for the service provider and network authentication entity based on the same pair of global keys (i.e. GPK and GSK). In another embodiment, the KMC 213 may initialize multiple pairs of the IBC-based global keys expressed in the following manner, (GPK_S1, GSK_S1), (GPK_S2, GSK_S2), (GPK_Sn, GSK_Sn)

(GPK_N1, GSK_N1), (GPK_N2, GSK_N2), (GPK_Nn, GSK_Nn)

where GPK refers to Global Public Key, GSK refers to Global Secret Key, S1 . . . Sn refers to the first to n pairs of global keys for the service provider and N1 . . . Nn refers to the first to n pairs of global keys for network authentication entity. The KMC 213 may own multiple pairs of Global Public Key and Global Secret Key (GPK, GSK) for both service provider 220 and network provider 210. When KMC 213 is configured with multiple pairs of GPK and GSK, an index may be assigned to each pair of the global keys to identify the pair.

In step 1110, process 1100 receives a request and determines whether the request is from either the user IDM or the network IDM. If the request is from the network IDM, process 1000 proceeds to step 1115. If the request is from the user IDM, process 1100 proceeds to step 1125.

In step 1115, the KMC 213 uses the NID received from the network IDM, the predetermined pair of global keys (GSK, GPK), together with the given IBC key generation algorithm to generate private key (SK) for the NID. If multiple pairs of GPK and GSK are configured for generating private keys, the KMC 213 generates multiple SKs for each NID.

In step 1120, the KMC 213 sends a message to the Network IDM 230. The message includes the SKs generated for the NID, and GPKs used for key generation in the operator network (i.e. GPK_N). The message may also include the GPKs that the network authentication entity needs for authenticating with the devices 110 (i.e. GPK_S).

When multiple pairs of global keys (GPK, GSK) are used in the key generation for either the network provider or service provider, the KMC 213 shall also include the index of the GPKs in the message.

In step 1125, the KMC 213 use the ID received from the user IDM 235, the predetermined GSK, GPK, together with the given IBC key generation algorithm to generate SK for each of the ID received from the user IDM. In one embodiment where only one pair of GPK and GSK is used for key generation, the KMC 213 generates one SK for each ID. In another embodiment where multiple pairs of GPK and GSK are being configured for key generation, the KMC 213 generates multiple SKs for each ID.

In step 1130, the KMC sends the generated IDs, corresponding SKs, together with GPKs and their index used in the SK generation to the service IDM entity 225. Each ID may have multiple SKs. For GPKs, they may include GPK for private key generation for the devices 110 (i.e. GPK_S), and GPK used for key generation in the operator network (i.e. GPK_N). Index is included if multiple pairs of GPK and GSK are being configured for key generation.

Process 1100 ends after step 1120 or 1130.

Figure 12:
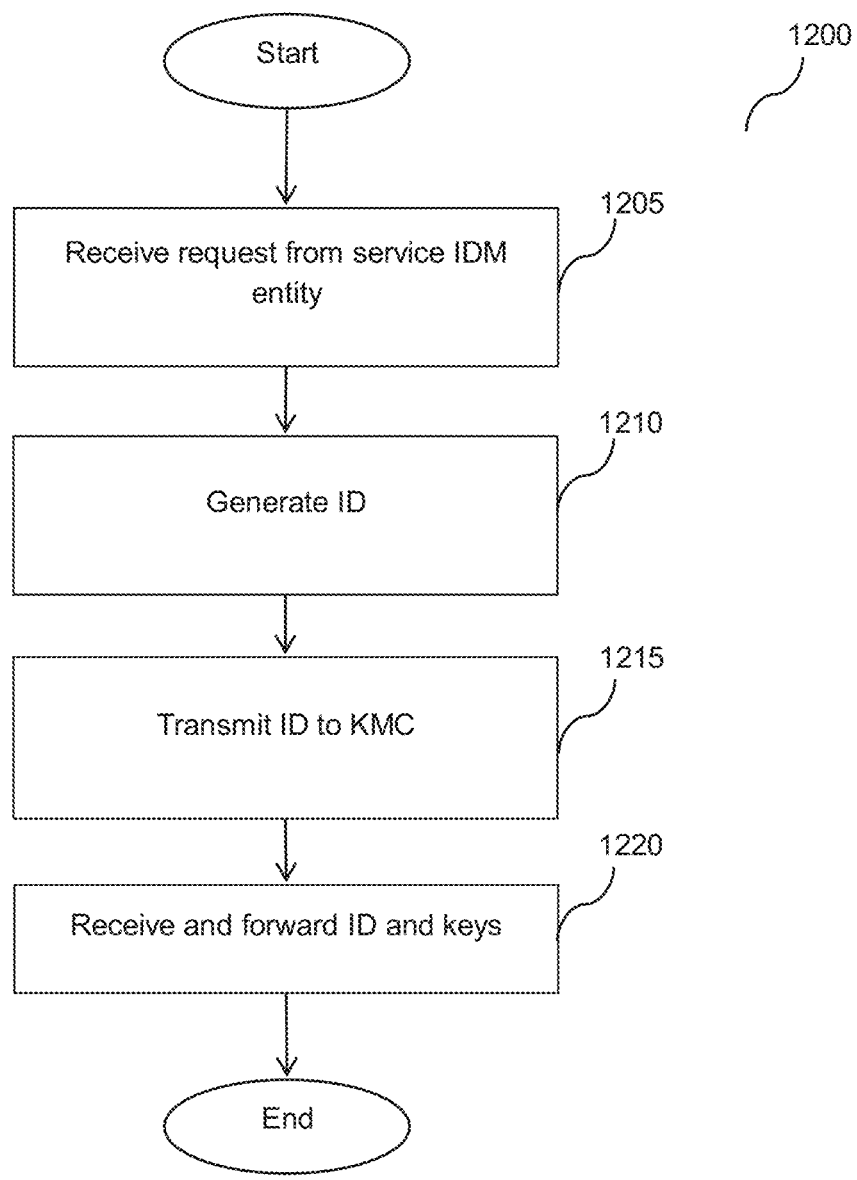
FIG. 12 illustrating a process 1200 performed by the user IDM in accordance with framework 300 in accordance with an embodiment of this disclosure.

FIG. 12 illustrates a process 1200 performed by the user IDM 235 in accordance with path 940 in framework 300. Process 1200 begins with step 1205 by receiving a request from the service IDM to obtain ID and SKs for its device. The request may include information such as number of IDs required and also a list of physical IDs extracted from the device.

In step 1210, in response to receiving the request from the service IDM, the user IDM 235 generates a number of IDs for the devices based on the information received, including the number of devices and the device physical IDs.

In step 1215, the user IDM 235 sends the generated IDs to the KMC for SK generation. Number of IDs is included in the message/request.

In step 1220, the user IDM 235 receives the generated IDs, corresponding SKs, together with GPKs (GPK_S and GPK_N) and their index used in the SK generation from the KMC and in turn forwards the IDs, corresponding SKs and GPKs to the Service IDM entity. Process 1200 ends after step 1220.

Figure 13:
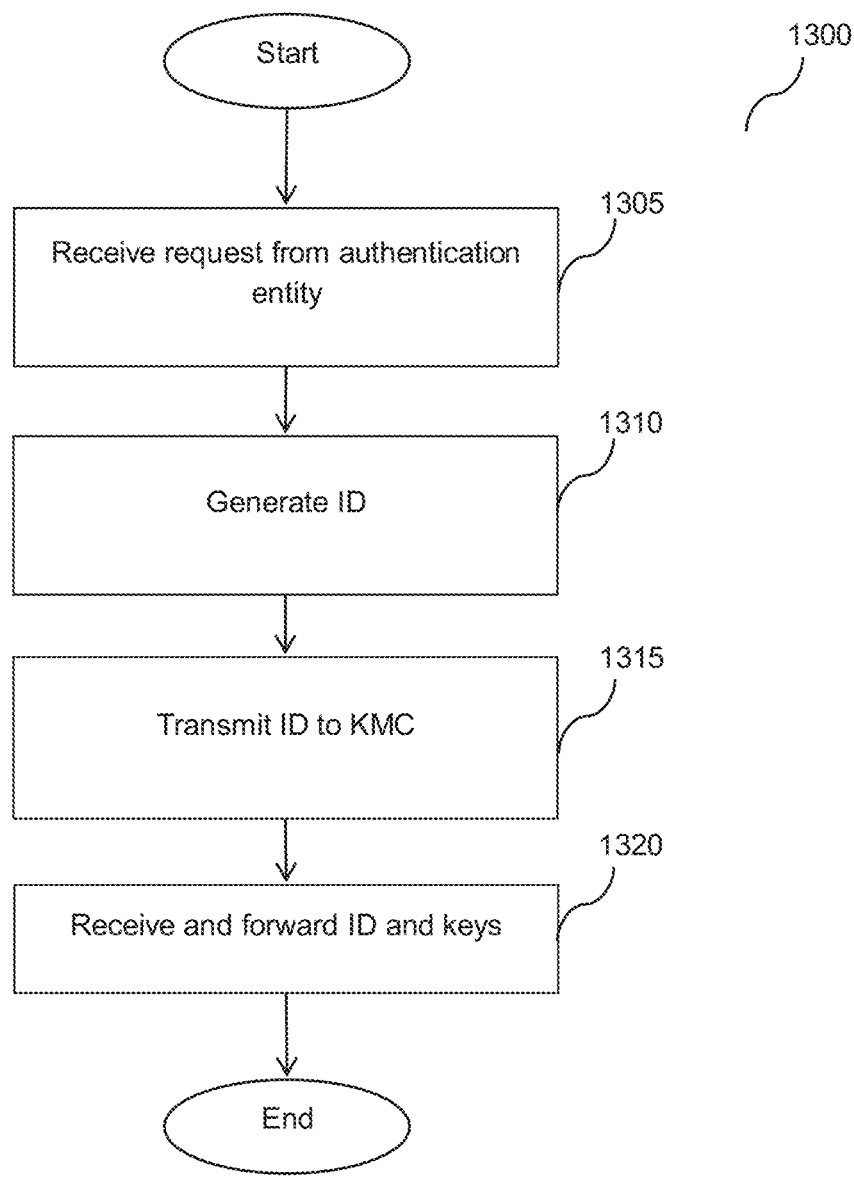
FIG. 13 illustrating a process 1300 performed by the network IDM in accordance with framework 300 in accordance with an embodiment of this disclosure.

FIG. 13 illustrates a process 1300 performed by the network IDM in accordance with path 920 in framework 300. Process 1300 begins with step 1305 by receiving a request/message for identity and authentication keys from the Network Authentication Entity/BS. The request includes an identity for network authentication entity such as NAE_ID and other information to identify the network authentication entity.

In step 1310, in response to receiving the request from the service IDM, the user IDM generates an ID, denoted as NID. The generated ID can be either the original ID or a combination of the received ID and expiry time and/or date. A type field may be included in the ID to indicate that the ID is for network authentication.

In step 1315, the network IDM sends a message/request with the NID to the KMC for SK generation.

In step 1320, the network IDM receives a message from the KMC. The message includes the SKs generated for the NID, and GPKs used for key generation in the operator network (i.e. GPK_N). The message may also include the GPKs that the network authentication entity needs for authenticating with the devices 110 (i.e., GPK_S). When multiple pairs of global keys (GPK, GSK) are used in the key generation for either the network provider or service provider, the message shall also include the index of the GPKs. Subsequently, the Network IDM entity forwards the NID and keys to the network authentication entity. Process 1300 ends after step 1320.

Figure 14:
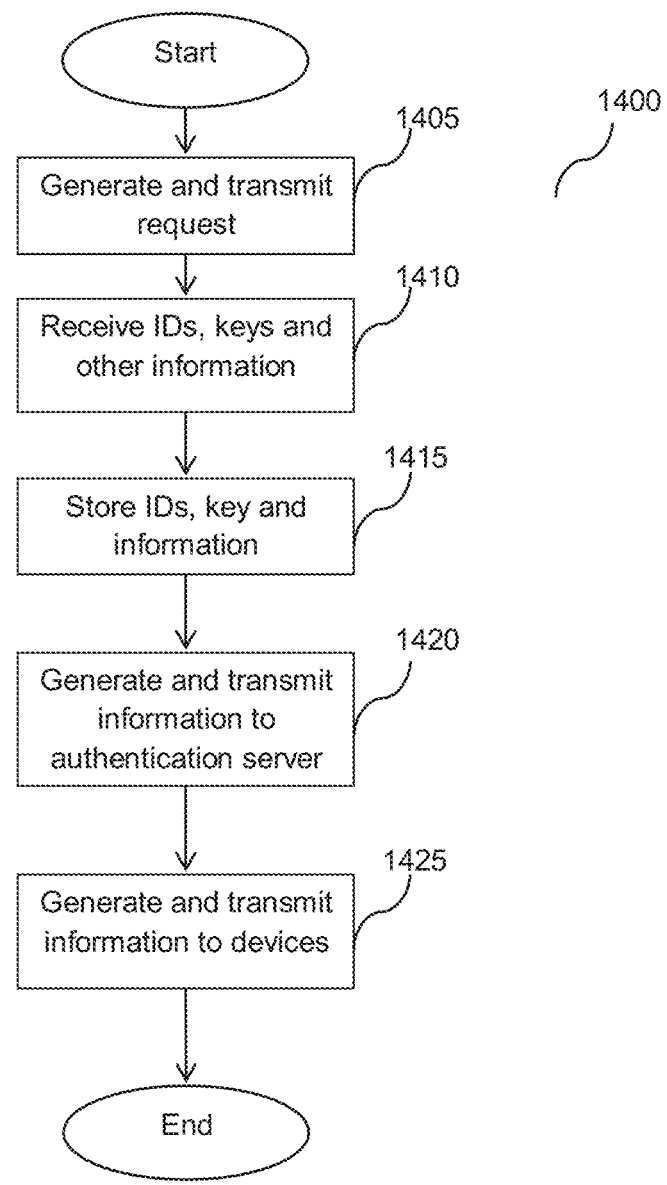
FIG. 14 illustrating a process 1400 performed by the service IDM entity in accordance with framework 200 or framework 300 in accordance with an embodiment of this disclosure.

FIG. 14 illustrates a process 1300 performed by the service IDM entity 225 in accordance with paths 930 and 940 in framework 200 or framework 300.

Process 1400 begins with step 1405 by generating and transmitting a request to the operator network. Particularly, in framework 200, the request would be transmitted to the KMC directly while in framework 300, the request would be transmitted to the User IDM. The information in the request would vary accordingly to the recipient and the IDs and keys required. Particularly, the information may include number of IDs required and a list of physical IDs from the devices. The information would be used by the operator network for generating new IDs and keys.

In step 1410, process 1400 receives the IDs, keys, GPK and other information such as index used in the key generation. Each ID may have multiple SKs. GPKs may not only include GPKs and their index used for SK generation for the user devices, but also include GPKs and their index used for network side ID and key generation.

In another embodiment, step 1410 may receive (1) SID, (2) SK, (3) GPK, and (4) maximum number of IDs allowed to be generated with this SID and SK to the Service IDM entity. It may also include the GPK used in generating SK for Network Authentication Entity if it is different from the one used in for SK generating for this SID. If multiple pairs of GPK and GSK are used in the SK generation in 815, the index is also included in the message.

In step 1415, process 1400 stores the information received from the operator network.

In step 1420, process 1400 generates and transmits information to the authentication server such as the service AAA. The information to be generated and transmitted includes an ID, the corresponding SK, and the GPK which is used in the SK generation. If multiple GPKs have been used for SK generation, then an index for the GPK and GSK pair shall be included in the request. In another embodiment, the information to be generated and transmitted includes ID and corresponding SK using the received SID, SK and GPK.

In step 1425, process 1400 generates and transmits information to the devices. The information to be generated and transmitted includes IDs, corresponding SKs, and GPK which is used in the SK generation. If multiple GPKs have been used for SK generation, then an index for the GPK and GSK pair shall be included in the request as well. In another embodiment, the information to be generated and transmitted includes IDs and corresponding SKs using the received SID, SK and GPK.

Steps 1420 and 1425 are independent to each other. In other words, they may be performed concurrently or sequentially.

Process 1400 ends after step 1425.

The proposed invention can be applied in networks that adopt distributed authentication framework, which requires distributing IBC-based ID and keys. A potential use could be the TOT device authentication in the 5G network.

The above is a description of embodiments of a method and system of a framework, implementing identity-based cryptography for generating and distributing IDs and keys between an operator provider network and a service provider network. It is foreseeable that those skilled in the art can and will design alternative method and system based on this disclosure that infringe upon this invention as set forth in the following claims.

What is claimed is:

1. A key generation and distribution method for an authentication framework for an operator provider network and a service provider network comprising:
receiving a first request from a first requestor, the first request comprising an identity of the first requestor;
generating a new identity (ID) based on the identity of the first requestor;
generating a secret key based on an Identity Based Cryptography (IBC) key generation algorithm for the new ID and a pair of global keys comprising a Global Secret Key (GSK) and a Global Public Key (GPK);
transmitting the new ID, the secret key and the GPK to the first requestor;
receiving a request from a second requestor, the request comprising a plurality of identities;
generating a plurality of new IDs by generating an individual new ID for each of the plurality of identities;
generating a plurality secret keys based on the IBC key generation algorithm for each of the plurality of new IDs;
transmitting the plurality of new IDs, the plurality of secret keys corresponding to each of the plurality of IDs, and the GPK to the second requestor;
transmitting the plurality of new IDs and the plurality of secret keys to one or more other devices; and
performing mutual authentication between the one or more other devices and one of the first and second requestors.

2. The key generation and distribution method according to claim 1, wherein the step of generating the secret key based on the IBC key generation algorithm for the new ID and the pair of global keys comprises:
determining the pair of global keys from a plurality of pairs of global keys, and
generating the secret key for the new ID with the determined pair of global keys.

3. The key generation and distribution method according to claim 2, wherein the step of generating the secret key based on the IBC key generation algorithm for the new ID and the pair of global keys further comprises:
repeating the steps of determining the pair of global keys from the plurality of pairs of global keys to determine a next pair of global keys from the plurality of pairs of global keys, and generating another secret key for the new ID to obtain a plurality of secret keys for the new ID.

4. The key generation and distribution method according to claim 3, wherein the step of transmitting the new ID, the secret key and the GPK to the first requestor further comprises:
transmitting a plurality of indexes associated with the pairs of global keys used for generating the secret keys.

5. The key generation and distribution method according to claim 1, wherein the step of generating the secret key based on the IBC key generation algorithm for each of the plurality of new IDs comprises:
determining the pair of global keys from a plurality of pairs of global keys, and
generating the secret key for the new ID with the determined pair of global keys.

6. The key generation and distribution method according to claim 5, wherein the step of generating the plurality of secret keys based on the IBC key generation algorithm for each of the plurality of new IDs further comprises:
repeating the steps of determining the pair of global keys from the plurality of pairs of global keys to determine a next pair of global keys from the plurality of pairs of global keys, and generating another secret key for each of the plurality of new IDs to obtain a plurality of secret keys for each of the plurality of new IDs.

7. The key generation and distribution method according to claim 3, wherein transmitting the plurality of new IDs, the secret keys corresponding to each of the plurality of IDs, and the GPK to the second requestor further comprises:
transmitting a plurality of indexes associated with the pairs of global keys used for generating the secret keys.

8. The key generation and distribution method according to claim 1, wherein the first requestor is a network authentication entity residing at the operator provider network and the second requestor is a Service Identity Management (IDM) entity residing at the service provider network.

9. The key generation and distribution method according to claim 1, wherein the new identity is generated by combining the identity of the first requestor and an index of the GPK.

10. The key generation and distribution method according to claim 1, wherein the secret key is generated by using the new identity and the pair of global keys together with the IBC key generation algorithm.

11. A key generation and distribution system for an authentication framework for an operating provider network comprising an authentication entity and a service provider network comprising an authentication server, the key generation and distribution system comprising:
a Network Identity Management (IDM), a User IDM and a Key Management Center (KMC) residing at the operating provider network; and
a Service IDM entity residing at the service provider network;
wherein the Network IDM comprises a processor, a memory, and instructions stored on the memory and executable by the processor to:
receive a request for credential from the authentication entity, the request comprising an identity of the authentication entity;
generate a new identity (ID) based on the identity of the authentication entity;
transmit the new ID to the KMC;
receive a secret key from the KMC; and
transmit the new ID and secret key to the authentication entity;
wherein the User IDM comprises a processor, a memory, and instructions stored on the memory and executable by the processor to:
receive a request for credentials from the Service IDM entity, the request comprising a plurality of identities;
generate a new identity (ID) for each of the plurality of identities;
transmit the new IDs to the KMC;
receive a plurality of secret keys from the KMC, each of the plurality of secret keys correspond to one of the plurality of identities; and
transmit the plurality of new IDs and plurality of secret keys to the Service IDM entity;
wherein the Service IDM entity comprises a processor, a memory, and instructions stored on the memory and executable by the processor to:
transmit a plurality of IDs to the User IDM;
receive the plurality of new IDs and the plurality of secret keys from the User IDM; and
distribute the plurality of new IDs and the plurality of secret keys to the authentication server and devices; and wherein the KMC comprises a processor, a memory, and instructions stored on the memory and executable by the processor to:

receive the new ID from the Network IDM, generate the secret key, transmit the secret key to the Network IDM; and receive the plurality of new IDs from the User IDM, generate the plurality of secret keys, transmit the plurality of secret keys to the Network IDM.

12. The key generation and distribution system according to claim 11, wherein the instructions of the KMC to receive the new ID from the Network IDM, generate the secret key, transmit the secret key to the Network IDM further comprises instructions executable by the processor to:

determine the pair of global keys from a plurality of pairs of global keys, and generate the secret key for the new ID with the determined pair of global keys.

13. The key generation and distribution system according to claim 12, wherein the instructions of the KMC to receive the new ID from the Network IDM, generate the secret key, transmit the secret key to the Network IDM further comprises instructions executable by the processor to:

repeatedly determine the pair of global keys from the plurality of pairs of global keys to determine a next pair of global keys from the plurality of pairs of global keys, and generate another secret key for the new ID to obtain a plurality of secret keys for the new ID.

14. The key generation and distribution system according to claim 13, wherein the instructions of the KMC to receive the new ID from the Network IDM, generate the secret key, transmit the secret key to the Network IDM further comprises instructions executable by the processor to:

transmit a plurality of indexes associated with the pairs of global keys used for generating the secret keys.

15. The key generation and distribution system according to claim 11, wherein the instructions of the KMC to receive the plurality of new IDs from the User IDM, generate the plurality of secret keys, transmit the plurality of secret keys to the Network IDM further comprises instructions executable by the processor to:

determine the pair of global keys from a plurality of pairs of global keys; and generate the secret key for the new ID with the determined pair of global keys.

16. The key generation and distribution system according to claim 15, wherein the instructions of the KMC to receive the plurality of new IDs from the User IDM, generate the plurality of secret keys, transmit the plurality of secret keys to the Network IDM further comprises instructions executable by the processor to:

repeatedly determine the pair of global keys from the plurality of pairs of global keys to determine a next pair of global keys from the plurality of pairs of global keys, and generate another secret key for each of the plurality of new IDs to obtain a plurality of secret keys for each of the plurality of new IDs.

17. The key generation and distribution system according to claim 16, wherein the instructions of the KMC to receive the plurality of new IDs from the User IDM, generate the plurality of secret keys, transmit the plurality of secret keys to the Network IDM further comprises instructions executable by the processor to:

transmit a plurality of indexes associated with the pairs of global keys used for generating the secret keys.

18. The key generation and distribution system according to claim 11, wherein the new ID is generated by combining the identity received and an expiry date of the identity.

19. The key generation and distribution system according to claim 11, wherein the secret key is generated by the KMC by using the new identity and a predetermined pair of global keys comprising a Global Public Key (GPK) and a Global Secret Key (GSK) together with an Identity Based Cryptography (IBC) key generation algorithm.

* * * * *